United States Patent
Shimohara

(10) Patent No.: US 8,293,837 B2
(45) Date of Patent: Oct. 23, 2012

(54) PIGMENT DISPERSION, AND INK COMPOSITION, CURABLE COMPOSITION AND CURABLE INK COMPOSITION PRODUCED WITH PIGMENT DISPERSION

(75) Inventor: Norihide Shimohara, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 338 days.

(21) Appl. No.: 12/715,413

(22) Filed: Mar. 2, 2010

(65) Prior Publication Data

US 2010/0240825 A1 Sep. 23, 2010

(30) Foreign Application Priority Data

Mar. 23, 2009 (JP) .................................. 2009-070746

(51) Int. Cl.
*C08G 18/06* (2006.01)
*C09D 175/04* (2006.01)
(52) U.S. Cl. ......... 524/589; 524/590; 523/160; 523/161
(58) Field of Classification Search .................. 524/589, 524/590; 523/160, 161
See application file for complete search history.

(56) References Cited

U.S. PATENT DOCUMENTS

| 3,467,483 | A | * | 9/1969 | Kalopissis et al. ................. 8/426 |
| 7,968,621 | B2 | * | 6/2011 | Oyanagi et al. ............... 523/160 |
| 2003/0092833 | A1 | | 5/2003 | Frieling et al. |
| 2010/0324206 | A1 | * | 12/2010 | Richards et al. .............. 524/590 |

FOREIGN PATENT DOCUMENTS

| EP | 0763378 A2 | 3/1997 |
| EP | 1834997 A1 | 9/2007 |
| JP | 2993088 B2 | 12/1999 |
| JP | 2002-503746 T | 2/2002 |
| JP | 2002-526254 T | 8/2002 |
| JP | 2003-119414 A | 4/2003 |
| JP | 2003-321628 A | 11/2003 |
| JP | 2004-018656 A | 1/2004 |
| JP | 2004-131589 A | 4/2004 |
| JP | 2007-277506 A | 10/2007 |
| WO | 2008/070601 A2 | 6/2008 |
| WO | WO2008070601 A2 * | 6/2008 |

OTHER PUBLICATIONS

Extended European Search Report dated Jun. 25, 2010, issued against the corresponding European patent application No. 10155854.2.

* cited by examiner

*Primary Examiner* — Satya Sastri
(74) *Attorney, Agent, or Firm* — SOLARIS Intellectual Property Group, PLLC

(57) ABSTRACT

The present invention provides a pigment dispersion, including: (a) a pigment; and (b) a polymer compound as a dispersant for the pigment (a), wherein the polymer compound includes a urethane bond in a main chain, includes a pendant moiety containing a skeleton which is the same as a partial skeleton of the pigment (a), and further includes, at a side chain, at least one polymer chain selected from the group consisting of a polyester chain, a poly(meth)acrylate chain, and a polyalkylene oxide chain, and wherein the molecular weight of the skeleton which is the same as a partial skeleton of the pigment (a) is from 20 to 70% of the molecular weight of the pigment (a).

9 Claims, No Drawings

PIGMENT DISPERSION, AND INK COMPOSITION, CURABLE COMPOSITION AND CURABLE INK COMPOSITION PRODUCED WITH PIGMENT DISPERSION

CROSS-REFERENCE TO RELATED APPLICATION

This application claims priority under 35 USC 119 from Japanese Patent Application No. 2009-070746 filed on Mar. 23, 2009, the disclosure of which is incorporated by reference herein.

BACKGROUND

1. Field of the Invention

The present invention relates to a pigment dispersion, and an ink composition, a curable composition and a curable ink composition each produced with the pigment dispersion. More specifically, the invention relates to a pigment dispersion containing a highly dispersed pigment and having high dispersion stability; an ink composition that contains the pigment dispersion, has high storage stability under high temperature conditions and is capable of forming high-quality images; a curable composition capable of being cured by an irradiation of active energy rays; and a curable ink composition that is produced with the curable composition and capable of forming high-quality images.

2. Related Art

Image recording methods for forming images on recording media such as paper and plastic sheets based on image data signals include electrophotographic methods, sublimation- and melting-type thermal transfer methods, and inkjet methods. In particular, inkjet methods are applicable to inexpensive devices and make it possible to form an image directly on a desired image-receiving portion of a recording medium in an ink jetting process. Therefore, inkjet methods are advantageous in that ink may be efficiently used, running cost is low, and high resolution images may be recorded by jetting very small droplets.

Inkjet methods make it possible to perform printing on non-absorbent recording media such as plastic sheets and metal plates as well as printing on plain paper. The significant challenge to inkjet methods is to increase printing speed and image quality, and inkjet methods are characterized in that drying of droplets after printing and the time required for curing have a significant effect on the image sharpness.

A recoding method using an inkjet recording ink composition capable of being cured by the application of active energy rays is one of the inkjet methods. In this method, ink droplets may be cured by irradiation immediately after printing so that sharp images may be formed.

Such a curable inkjet ink composition requires high pigment dispersibility for the formation of high resolution images with high color development. Concerning inkjet ink, it is also important to control the viscosity and surface tension of the ink, because fine ink droplets are jetted at high frequency from small orifices.

Making fine pigment particles are essential to impart vivid color tone and high coloring strength to ink compositions. In particular, an inkjet recording ink composition has to be produced with particles smaller than the thickness of the cured ink film to be formed with the ink composition, because the jetted ink droplets have a significant effect on the sharpness of the image and therefore the amount of the jetted droplets is kept small. As pigment particles are made finer for higher coloring strength, it becomes more difficult to disperse the particle, and aggregates are more likely to be produced. In addition, when a dispersing agent is added, the problem of an increase in the viscosity of the composition may also occur. The production of pigment aggregates or an increase in the viscosity of the ink composition has an adverse effect on the ink jetting property. Therefore, an ink composition containing pigment aggregates or having an increased viscosity is not suitable for use in inkjet recording.

An inkjet recording ink composition also has to have good heat-cycle resistance. An ink composition contained in a cartridge is heated so as to have a reduced viscosity during jetting but cooled during the non jetting period or storage. Therefore, it undergoes cycles of temperature change between heating and cooling. The temperature change also has an adverse effect on the pigment dispersibility and causes a problem in which the pigment dispersibility is decreased over time so that pigment aggregation or viscosity increase is more likely to occur.

Curing properties for the formation of sharp images and the physical properties of the cured film are also important factors of a curable inkjet ink composition. A curable inkjet ink composition should be more cured rapidly by irradiation so that the sharpness of the image may be ensured. Therefore, a pigment dispersing agent that may inhibit curing, a pigment dispersing agent that contains a solvent as a non-curable component, or a pigment dispersing agent that is not crosslinked with the cured film and may reduce the surface tackiness is not preferred, because it may cause a reduction in curing properties, blurring, or a reduction in productivity.

If such a compound is mixed, a so-called blocking problem may occur in which the printed surface adheres to the recording medium during the storage of stacked prints so that the printed surface of the recorded product and the recording medium are stained.

Therefore, there has been a demand for an ink composition that has sufficient fluidity, contains a finely and stably dispersed pigment and has good curing properties. Various dispersing agents are proposed to form stable pigment dispersion.

There are proposed an ink composition produced using a pigment derivative as a dispersing agent for improving the affinity to the pigment (see for example Japanese Patent Application Laid-Open (JP-A) Nos. 2003-119414 and 2004-18656), an ink composition produced using a specific pigment such as a phthalocyanine or quinacridone pigment and a basic group-containing polymer as a dispersing agent (see for example JP-A No. 2003-321628), an organic solvent-free ink composition containing such a dispersing agent as a poly (ethyleneimine)-poly(12-hydroxystearic acid) graft polymer and a specific monomer capable of dissolving the dispersing agent (see for example JP-A No. 2004-131589), an ink composition produced using, as a dispersing agent, a polyurethane having a pendant of a neutralized salt such as a carboxylate, a phosphate, a sulfonate or a quaternary ammonium (see for example Japanese Patent Application National Publication (Laid-Open) No. 2002-503746), a non-aqueous pigment dispersion composition produced using a graft copolymer of a nitrogen atom-containing, polymerizable, vinyl macromonomer (see for example JP-A No. 2007-277506), and a polyurethane dispersing agent containing a polymer including N-vinylamide, N-vinyllactam, vinyl, or ally-substituted, nitrogen-containing heterocycle and containing another polymer as a graft chain (see for example Japanese Patent Application National Publication (Laid-Open) No. 2002-526254).

The use of these pigment dispersing agents or ink compositions makes it possible to ensure fine dispersion of pigments and to have higher ink stability than the other conventional techniques. However, when they are used to form low-viscosity ink compositions such as inkjet ink compositions, the high-temperature stability of the resulting ink compositions is not sufficient, and when they are used to form curable ink compositions, the curing sensitivity or anti-blocking properties are insufficient.

There is also proposed a method of using an acrylic copolymer having a tertiary amino group and an atomic group of an organic pigment to produce an ink composition excellent in fluidity, film vividness, glossiness, and coloring strength (see for example Japanese Patent No. 2993088). However, such a technique has an insufficient affinity to the ink medium and therefore further stability is required.

SUMMARY

The present invention has been made in view of the above circumstances and provides a pigment dispersion, containing (a) a pigment; and (b) a polymer compound as a dispersant for the pigment (a), wherein the polymer compound comprises a urethane bond in a main chain, comprises a pendant moiety comprising a skeleton which is the same as a partial skeleton of the pigment (a), and further comprises, at a side chain, at least one polymer chain selected from the group consisting of a polyester chain, a poly(meth)acrylate chain, and a polyalkylene oxide chain, and wherein the molecular weight of the skeleton which is the same as a partial skeleton of the pigment (a) is from 20 to 70% of the molecular weight of the pigment (a).

DETAILED DESCRIPTION OF THE INVENTION

As a result of elaborate investigations, the inventor has made the invention, based on the finding that using a specific copolymer as a pigment dispersing agent makes it possible to produce a pigment dispersion containing a highly dispersed pigment, is effectively prevented from a reduction in stability even after long-term storage or cycles of temperature change, and also has good photo-curing properties and that an ink composition and a curable composition may be produced with such a pigment dispersion.

Pigment Dispersion

In an embodiment of the invention, the pigment dispersion is a composition including a medium and a pigment uniformly dispersed in the medium. The medium may be a liquid or a solid. The pigment dispersion of the invention has good dispersion stability, so that it does not increase in viscosity or aggregate even when a low-viscosity liquid is used as the medium.

The pigment dispersion of the invention includes: (a) a pigment; and (b) a polymer compound as a dispersant for the pigment (a), having a urethane bond in the main chain, and having a pendant moiety including a skeleton which is the same as a partial skeleton of the pigment (a), and further having, at a side chain, at least one polymer chain selected from the group consisting of a polyester chain, a poly(meth)acrylate chain, and a polyalkylene oxide chain wherein the molecular weight of the skeleton which is the same as a partial skeleton of the pigment (a) is from 20 to 70% of the molecular weight of the pigment (a), (hereinafter, also referred to as "the specific polymer compound (b)").

In other words, the specific polymer compound (b) according to the invention satisfies the following three conditions:
(b-1) Its main chain has a urethane bond;
(b-2) Its main chain has a pendant moiety including a skeleton which is the same as a partial skeleton of the pigment (a) coexisting with it, and the skeleton which is the same as the partial skeleton of the pigment has a molecular weight corresponding to 20 to 70% of the molecular weight of the pigment (a); and
(b-3) It has, at a side chain thereof, at least one polymer chain selected from the group consisting of a polyester chain, a poly(meth)acrylate chain, and a polyalkylene oxide chain.

In the pigment dispersion of the invention, the pigment is stably dispersed by the effect of the specific polymer compound satisfying the conditions (b-1) to (b-3) for the pigment dispersion.

The specific polymer compound (b) has a pendant moiety including a skeleton which is the same as a partial skeleton of the pigment. Therefore, the specific polymer compound (b) well adsorbs on the pigment (a), so that the pigment (a) may be effectively coated with the specific polymer compound (b), thereby preventing aggregation of the pigment (a).

It is also considered that since the specific polymer compound (b) has high adsorbing capability, the specific polymer compound (b) is less likely to be desorbed even when stored at high temperature, thereby maintaining dispersion stability at high temperature. At least one polymer chain selected from the group consisting of a polyester chain, a poly(meth)acrylate chain, and a polyalkylene oxide chain is preferably introduced into the side chain of the specific polymer compound (b). The introduced polymer chain forms a partial structure having a high affinity to a medium and therefore may spread in a liquid medium to produce a high steric repulsion effect. Thanks to these effects, the pigment dispersion of the invention may exhibit high dispersion stability, even at high temperature where desorption of the pigment dispersing agent is facilitated.

The components of the pigment dispersion of the invention are described in detail below.

<Polymer compound as a dispersant for the pigment, having (b-1) a urethane bond in the main chain, (b-2) a pendant moiety including a skeleton which is the same as a partial skeleton of the pigment (a), and (b-3) at least one polymer chain selected from the group consisting of a polyester chain, a poly(meth)acrylate chain, and a polyalkylene oxide chain at a side chain wherein the molecular weight of the skeleton which is the same as a partial skeleton of the pigment (a) is from 20 to 70% of the molecular weight of the pigment (a)>

The specific polymer compound (b) contained in the pigment dispersion of the invention has: (b-1) a urethane bond in the main chain; (b-2) a pendant moiety including a skeleton which is the same as a partial skeleton of the pigment (a); and (b-3) at least one polymer chain selected from the group consisting of a polyester chain, a poly(meth)acrylate chain, and a polyalkylene oxide chain, at a side chain, wherein the molecular weight of the skeleton which is the same as a partial skeleton of the pigment (a) is from 20 to 70% of the molecular weight of the pigment (a).

The term "pendant" means that the skeleton that is the same as a partial skeleton of the pigment (a) is attached through a liking group to a polyurethane structure that forms the main chain, and is not intended to include a structure in which the skeleton that is the same as a partial skeleton of the pigment is directly incorporated in the main chain structure of a polyurethane having urethane bonds.

The skeleton that is the same as a partial skeleton of the pigment (a) is preferably incorporated in the specific polymer compound (b) through a connecting group that may have a substituent having 1 to 20 carbon atoms. Such a connecting group provides good molecular mobility and advantageously affects on the adsorption onto the pigment.

In an embodiment of the invention, the skeleton that is the same as a partial skeleton of the pigment (a) and contained in the specific polymer compound (b) is preferably a partial structure forming part of the molecular structure of the pigment (a) in the pigment dispersion or preferably an analogue of the partial structure. The skeleton of the pigment is preferably a fused ring structure consisted of two or more rings, more preferably a fused ring structure consisted of two or three rings.

If the partial structure having a skeleton that is the same as the pigment has a light absorption between 380 nm and 800 nm, the partial structure may change the hue derived from the pigment in the pigment dispersion. Therefore, the skeleton that is the same as a partial skeleton of the pigment (a) is preferably a partial structure which itself is not a chromophore structure necessary for sufficient color development of the pigment, however a partial structure from which a sufficient color density may not be obtained. Therefore, for example, when an acetolone pigment or a naphtholone pigment is used, the pendant moiety of the specific polymer compound (b) is preferably not an azo chromophore structure but a non-chromophore structure such as a benzimidazolone structure. Similarly, an acridone structure for a quinacridone pigment, a phthalimide structure for a perylene pigment, an anthraquinone structure for an anthraquinone pigment, an azo substituent-free naphthalene structure for a naphthol AS pigment, and a carbazole structure for a dioxazine violet pigment are preferably used, respectively.

The molecular weight of the skeleton that is the same as a partial skeleton of the pigment (a) and contained in the specific polymer compound (b) is preferably in the range of 20 to 70% of the molecular weight of the pigment (a), more preferably in the range of 30 to 65% of the molecular weight of the pigment (a). In the above range, a sufficient level of affinity and adsorption properties may be produced for the pigment with no change in the desired hue of the pigment (a) in the pigment dispersion.

Some examples of the skeleton (b-2) that is the same as a partial skeleton of the coexisting pigment (a) are shown below together with the structure of the pigment (a) used in combination therewith. Each parenthesized percentage indicates the percentage of the molecular weight of the skeleton (b-2) the same as a partial skeleton of the pigment (a) to the molecular weight of the pigment (a). These are preferred examples of a combination of the pigment (a) and the partial structure in the pendant moiety of the specific polymer compound (b), which are not intended to limit the scope of the invention.

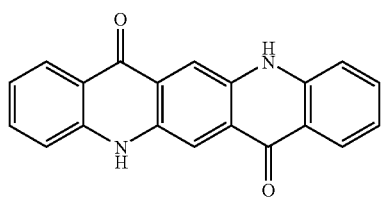

PV19 Mw = 312.3

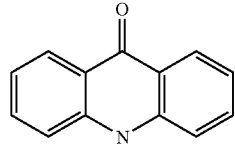

Acridone Mw = 194.2 (62%)

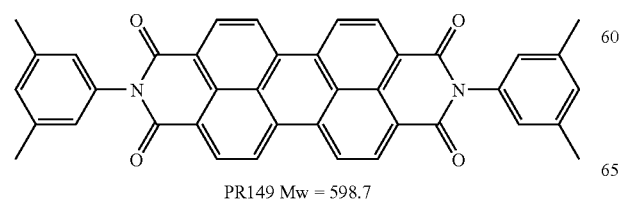

PR149 Mw = 598.7

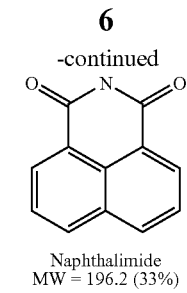

Naphthalimide
MW = 196.2 (33%)

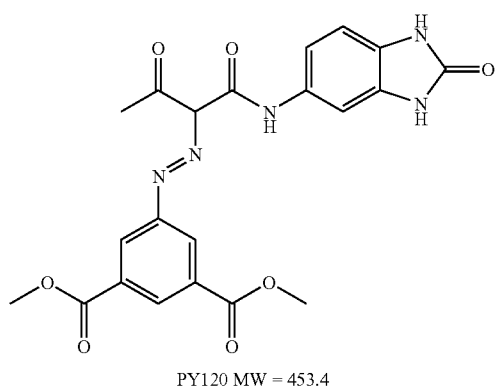

PY120 MW = 453.4

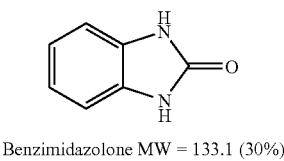

Benzimidazolone MW = 133.1 (30%)

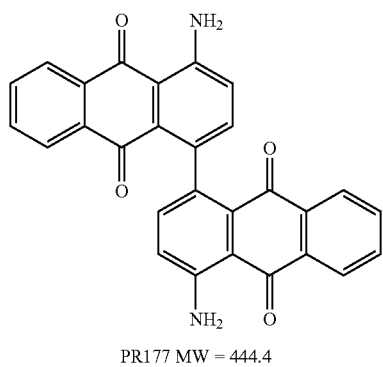

PR177 MW = 444.4

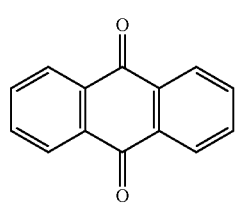

Anthraquinone MW = 207.2 (47%)

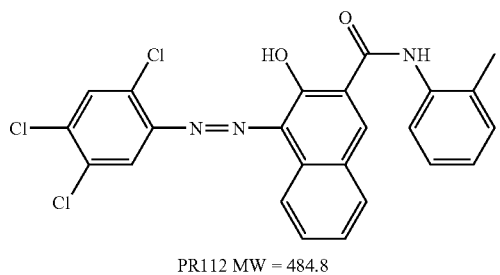

PR112 MW = 484.8

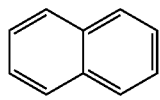

Naphthlaene MW = 12.2 (26%)

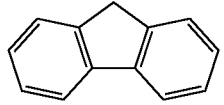

Carbazole MW = 165.2 (28%)

In an embodiment of the invention, the skeleton that is the same as a partial skeleton of the pigment (a) forms a pendant moiety attached to the polyurethane bond-containing main chain structure. Therefore, the polymer compound having the pendant moiety may be easily obtained by the synthesis of a polyurethane using the reaction of a derivative having one or two hydroxyl or isocyanate groups and the skeleton that is the same as a partial skeleton of the pigment (a) with a compound having an isocyanate and/or hydroxyl group(s). Some examples of the compound having one or two hydroxyl or isocyanate groups and the skeleton that is the same as a partial skeleton of the pigment (a) are shown below, which are not intended to limit the scope of the invention.

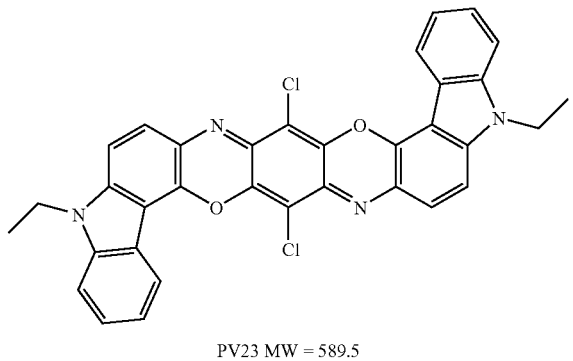

PV23 MW = 589.5

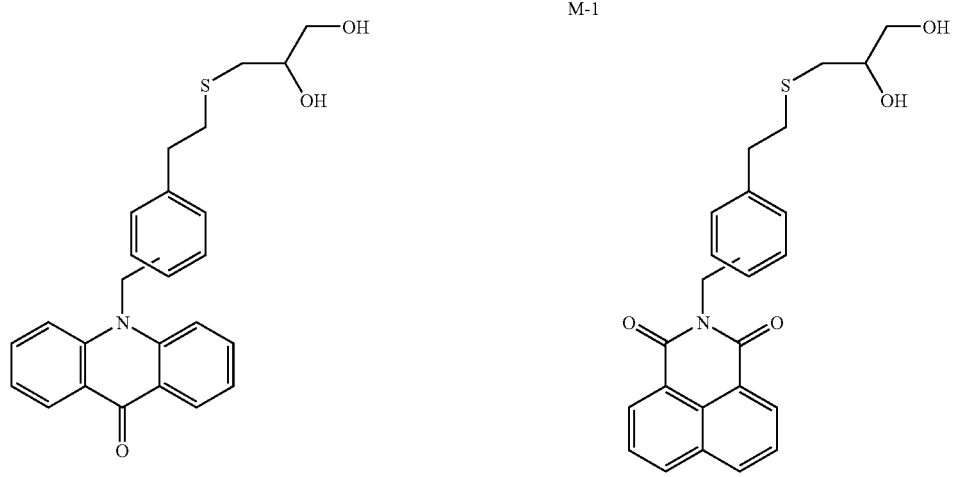

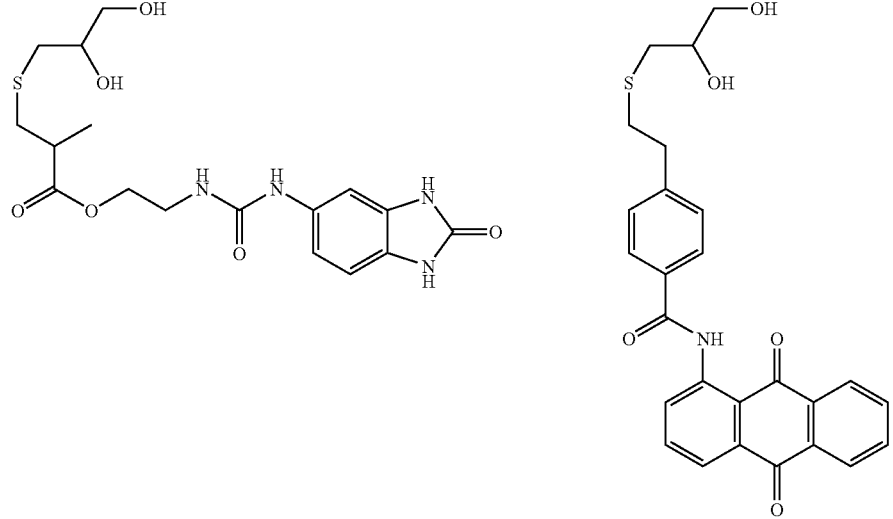

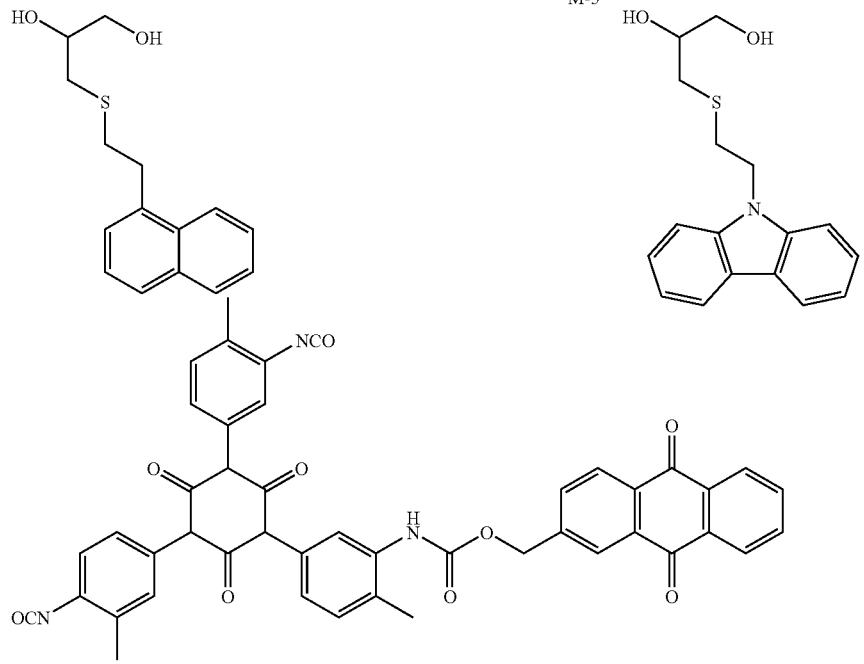

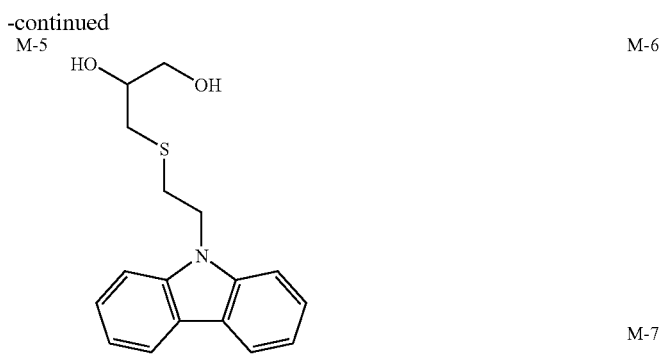

In an embodiment of the invention, the specific polymer compound (b) is a branched polymer having, at a side chain, at least one polymer chain selected from the group consisting of a polyester chain, a poly(meth)acrylate chain, and a polyalkylene oxide chain.

In an embodiment of the invention, the specific polymer compound (b) may be obtained by allowing (i) a derivative having one or two hydroxyl or isocyanate groups and a skeleton that is the same as a partial skeleton of the pigment (a), (ii) a polyester having one or two hydroxyl groups at the terminal, a poly(meth)acrylate having one or two hydroxyl groups at the terminal or a polyalkylene oxide having one or two hydroxyl groups at the terminal, and (iii) a bifunctional or polyfunctional isocyanate compound to react together in an organic medium.

The organic medium to be used may be any known organic medium that is capable of dissolving the raw materials and the polymer product and not reactive with the isocyanate compound. Organic media that are preferably used include ketones, esters, amides, sulfoxides, and ethers. When the pigment dispersion of the invention is used as a curable composition, a polymerizable compound having an ethylenic double bond, so called a vinyl monomer, is also preferably used as the organic medium. In an embodiment of the invention, a catalyst such as alkylamine, dibutyltin dilaurate, or bismuth triol may be added in the process of synthesizing the specific polymer compound (b).

The polymer chain selected from the group consisting of a polyester chain, a poly(meth)acrylate chain, and a polyalkylene oxide chain is a component for imparting an affinity to the medium. The polymer chain may be selected according to the affinity to the solvent, any of them having a high affinity may be used. One or two hydroxyl groups may be introduced at the terminal of these polymer chains so as to be capable of reactive with the isocyanate compound. Therefore, the polymer chains may be easily introduced into the specific polymer compound (b).

In an embodiment of the invention, the specific polymer compound (b) may be a branched polymer having a polymer chain selected from the group consisting of a polyester chain, a poly(meth)acrylate chain and a polyalkylene oxide chain. The polymer chain may also be introduced by a method including synthesizing a functionalized polyurethane and then allowing the functional group of the polyurethane to react with a reactive terminal group of a polymer chain selected from the group consisting of a polyester chain, a poly(meth)acrylate chain and a polyalkylene oxide chain.

In view of an affinity to the medium, the polyester for use in an embodiment of the invention is preferably an aliphatic polyester, which has high mobility. Aliphatic polyesters may be synthesized by ring-opening polymerization of lactones. For example, aliphatic polyesters with different affinities for the solvent may be synthesized by copolymerization of different monomers such as ε-caprolactam, γ-butyrolactone, and valerolactone. For example, the polyalkylene oxide may be obtained by ring-opening polymerization of a cyclic ether such as ethylene oxide, propylene oxide, an oxetane compound, or tetrahydrofuran. The affinity of the polyalkylene oxide to the medium may be controlled to be more suitable by copolymerization of different cyclic ethers. The resulting polyester or polyalkylene oxide may be allowed to react with glycidol or the like so that a diol group may be introduced at the terminal.

The poly(meth)acrylate may be easily synthesized by the reaction of (meth)acrylate with a mercapto compound having a hydroxyl group. Examples of compounds serving as chain transfer agents that are preferably used in an embodiment of the invention are shown below, while any chain transfer agent with which the desired polymer for the invention may be produced may be used without restrictions. Examples of chain transfer agents capable of introducing one hydroxyl group at the chain terminal include 2-mercapto-1-ethanol, 3-mercapto-1-propanol, 3-mercapto-3-methylbutan-1-ol, 6-mercapto-1-hexanol, and 11-mercapto-1-undecanol. Chain transfer agents capable of introducing two hydroxyl groups at the chain terminal include 1-thioglycerol.

The substituent having the ester moiety of the poly(meth)acrylate (for example, in the case of poly(alkyl acrylate), the substituent means the alkyl group) is preferably an alkyl group having 1 to 20 carbon atoms or an aryl group having 6 to 20 carbon atoms, any of which may be substituted with a functional group. For example, the alkyl group may have such a substituent as an acyl group, an aryl group having 6 to 10 carbon atoms, an alkoxy group having 1 to 8 carbon atoms, a glycidyl group, or an alkenyl group having 2 to 10 carbon atoms.

Preferred examples of the polyester having one or two hydroxyl groups introduced at the terminal, the poly(meth)acrylate having one or two hydroxyl groups introduced at the terminal, and the polyalkylene oxide having one or two hydroxyl groups introduced at the terminal are shown below, which are not intended to limit the scope of the invention. In the following compounds, n represents an integer of from 5 to 60.

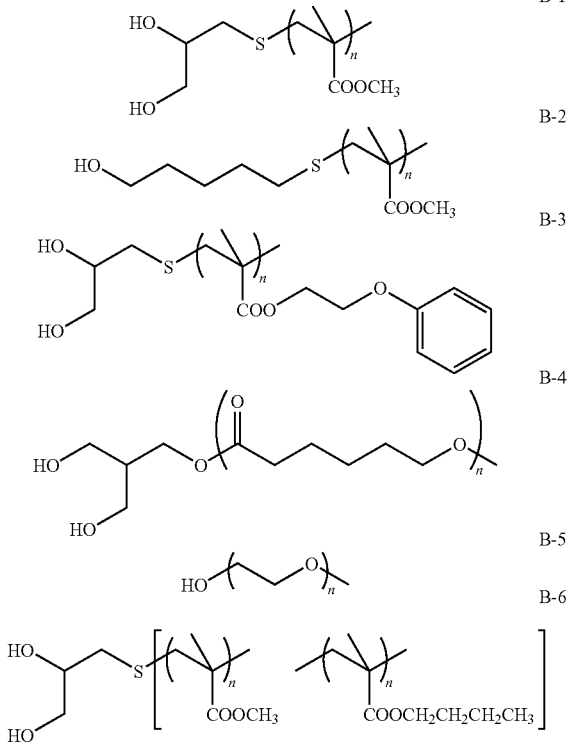

The polyester, the poly(meth)acrylate, or the polyalkylene oxide preferably has a number average molecular weight of 350 to 15,000, more preferably 500 to 12,000, even more preferably 1,000 to 10,000. In the above range, a sufficient steric repulsion effect may be obtained, while an increase in the viscosity of the specific polymer compound (dispersing agent) may be prevented.

In an embodiment of the invention, a bifunctional or polyfunctional isocyanate compound is preferably used for the synthesis of the specific polymer compound (b).

The isocyanate compound preferably has two to six isocyanate groups, more preferably two or three isocyanate groups. Examples of compounds having two to six isocyanate groups include organic polyisocyanates.

Any known conventional organic polyisocyanate may be used. Examples of aromatic diisocyanates include 4,4'-diphenylmethane diisocyanate (MDI), 2,4- or 2,6-tolylene diisocyanate (TDI), m- or p-phenylene diisocyanate, 1,3- or 1,4-xylylene diisocyanate (XDI), 1,5-naphthalene diisocyanate (NDI), and 3,3'-dimethyl-4,4'-biphenylene diisocyanate (TODI).

Examples of aliphatic diisocyanates include hexamethylene diisocyanate (HDI), hydrogenated MDI (H12MDI), and isophorone diisocyanate (IPDI).

Prepolymer type, nurate type, urea type, or carbodiimide type modified products of these diisocyanates are also preferably used in an embodiment of the invention. Two or more of these diisocyanates or modified products may also be used in the form of a mixture.

In an embodiment of the invention, the specific polymer compound (b) may be obtained by the reaction of three components: a compound having one or two hydroxyl groups or one or two isocyanate groups and a skeleton that is the same as a partial skeleton of the pigment (a); a polymer selected from the group consisting of a polyester having a hydroxyl group, a poly(meth)acrylate having a hydroxyl group, and a polyalkylene oxide having a hydroxyl group; and a bifunctional or polyfunctional isocyanate compound. In addition, if necessary, a pigment and a compound having a basic functional group or an acidic functional group and one or two hydroxyl or primary amino groups may be used in the process of synthesizing the specific polymer compound (b). The introduction of the basic or acidic functional group into the polymer chain may preferably cause acid-base interaction with the pigment to facilitate the adsorption of the specific polymer compound (b) onto the pigment (a).

In an embodiment of the invention, a known compound having a basic or acidic functional group and one or two hydroxyl or primary amino groups may be used.

Examples of such a compound having a basic or acidic functional group and one or two hydroxyl or primary amino groups include N,N-dimethylethanolamine, N,N-diethylethanolamine, 3-dimethylamino-1-propanol, 1,3-bis(dimethylamino)-2-propanol, pyrrolidino-1,2-propanediol, 1-(2-aminoethyl)pyrrolidine, histamine, 1-(3-aminopropyl)imidazole, 2,6-pyridinedimethanol, 4-pyridinepropanol, lactic acid, 10-hydroxydecanoic acid, and 4-(hydroxymethyl)benzoic acid.

In an embodiment of the invention, if necessary, a chain extender for controlling the reactivity or the physical properties of the polymer may be used for the specific polymer compound (b). Any known conventional chain extender may be used. Examples include low-molecular-weight polyols such as ethylene glycol, propylene glycol, diethylene glycol, 1,4-butanediol, 1,6-hexanediol, trimethylolpropane, neopentyl glycol, hydroquinone, bis(hydroxyethyl)benzene, 2,2'- or 4,4'-dihydroxydiphenylmethane, and 2,2-bis(4-hydroxyphenyl)propane; and low-molecular-weight diamines such as ethylenediamine, propylenediamine, m- or p-phenylenediamine, 1,3- or 1,4-xylylenediamine, and isophoronediamine.

The specific polymer compound (b) serving as a dispersing agent may be synthesized using (i) a derivative having one or two hydroxyl groups or one or two isocyanate groups and a skeleton that is the same as a partial skeleton of the pigment (a), (ii) a polyester having one or two hydroxyl groups at the terminal, a poly(meth)acrylate having one or two hydroxyl groups at the terminal or a polyalkylene oxide having one or two hydroxyl groups at the terminal, and (iii) a bifunctional or polyfunctional isocyanate compound. Based on the total weight of the specific polymer compound (b), the contents of the compounds (I), (ii) and (iii) are preferably 2 to 40% by weight of the compound (I), 50 to 95% by weight of the compound (II) and 3 to 50% by weight of the compound (iii), more preferably 3 to 30% by weight of the compound (I), 50 to 80% by weight of the compound (II) and 4 to 40% by weight of the compound (iii).

In an embodiment of the invention, the specific polymer compound (b) preferably a weight average molecular weight of 5,000 to 200,000, more preferably 10,000 to 200,000, even more preferably 15,000 to 180,000. When the molecular weight is in the above range, the pigment dispersion may have relatively low viscosity and good dispersion stability.

Some examples of the specific polymer compound (b) for use in an embodiment of the invention are shown below, which are not intended to limit the scope of the invention.

TABLE 1

| | (i) | (ii) | (iii) | Acid-base interaction compound | Chain extender | Weight average molecular weight |
|---|---|---|---|---|---|---|
| P-1 Compound | M-1 | B-1 | TDI | PDM | DEG | 120,000 |
| Molecular weight (weight average Mw) | 419.5 | 6000 | 168 | 139.2 | 106 | |
| Composition ratio (% by weight) | 9 | 64.2 | 18 | 3.1 | 5.7 | |
| P-2 Compound | M-2 | B-4 | TDI | PDM | — | 38,000 |
| Molecular weight (weight average Mw) | 421.5 | 900 | 168 | 139.2 | | |
| Composition ratio (% by weight) | 10.9 | 46.8 | 29.1 | 13.2 | | |
| P-3 Compound | M-1 | B-5 | MITEC GP770A | PDM | DEG | 45,000 |
| Molecular weight (weight average Mw) | 419.5 | 1200 | 522.5 | 139.2 | 106 | |
| Composition ratio (% by weight) | 7.7 | 44.2 | 38.6 | 7.2 | 2.3 | |
| P-4 Compound | M-2 | B-1 | TDI | PDM | DEG | 110,000 |
| Molecular weight (weight average Mw) | 421.5 | 6000 | 168 | 139.2 | 106 | |
| Composition ratio (% by weight) | 6.8 | 73 | 13.6 | 4.0 | 2.6 | |
| P-5 Compound | M-6 | B-6 | MITEC GP770A | HMBA | DEG | 60,000 |
| Molecular weight (weight average Mw) | 301.4 | 1300 | 522.5 | 152.2 | 106 | |
| Composition ratio (% by weight) | 7.1 | 24.5 | 49.4 | 11.5 | 7.5 | |
| P-6 Compound | M-7 | B-1 | TDI | PDM | DEG | 70,000 |
| Molecular weight (weight average Mw) | 757.7 | 6000 | 168 | 139.2 | 106 | |
| Composition ratio (% by weight) | 10.2 | 80.8 | 4.2 | 3.1 | 1.7 | |

In the table, M-1 to M-7 and B-1 to B-6 correspond to the exemplary compounds shown above. TDI represents tolylene diisocyanate, MITEC GP770A a trifunctional isocyanate (tolylene diisocyanate trimer, manufactured by Mitsubishi Chemical Corporation), DEG diethylene glycol, PDM 2,6-pyridinedimethanol, and HMBA 4-(hydroxymethyl)benzoic acid.

Shown below are the repeating unit structures of the examples (P-1 to P-6) of the specific polymer compound shown in the table. It is considered that the polymer has such a structure that the diol-derived repeating unit (shown to the left of the slanted line) and the isocyanate-derived repeating unit (shown to the right of the slanted line) are alternately linked in any order and direction. In the following compounds, n represents an integer of from 5 to 60.

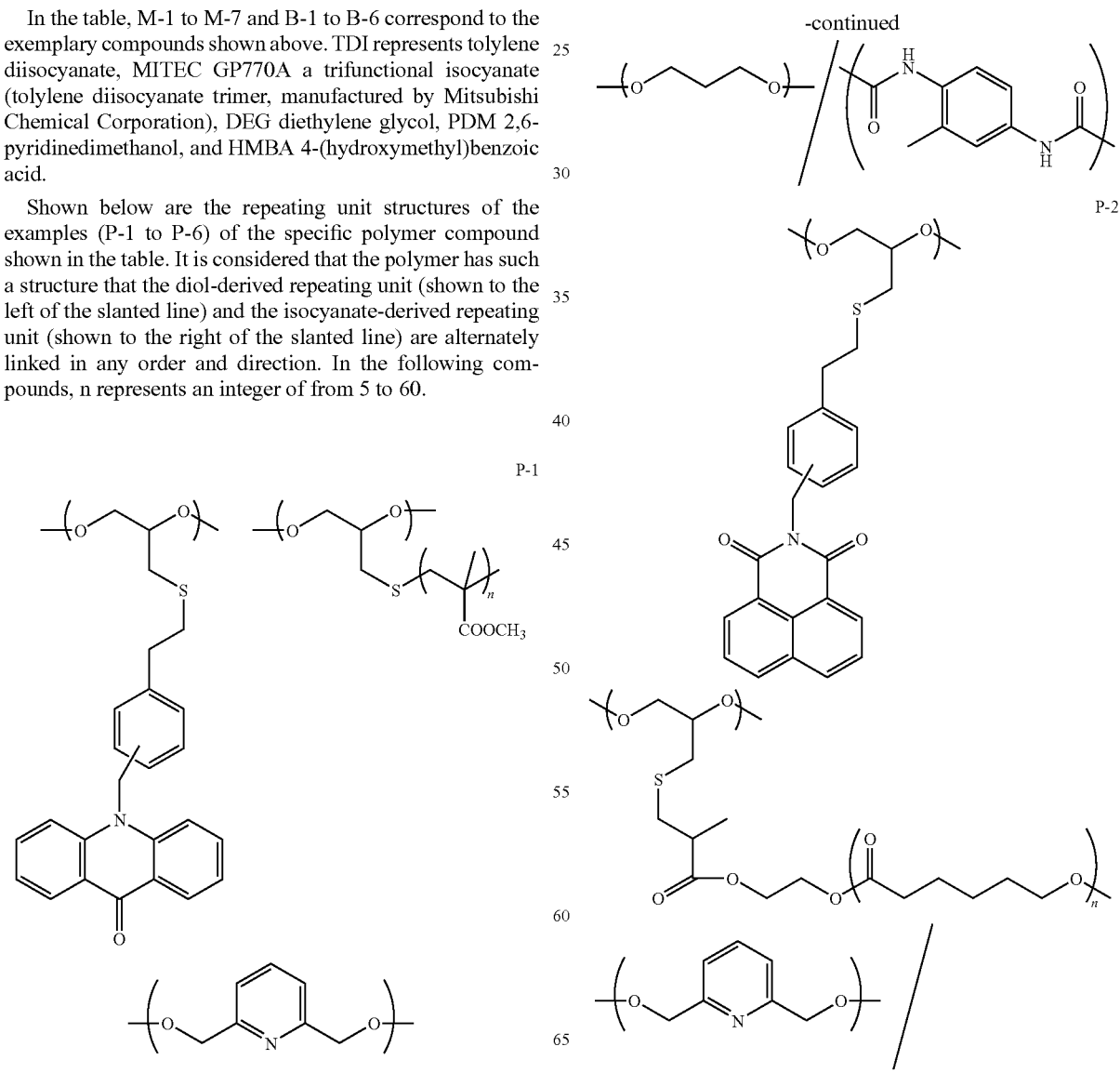

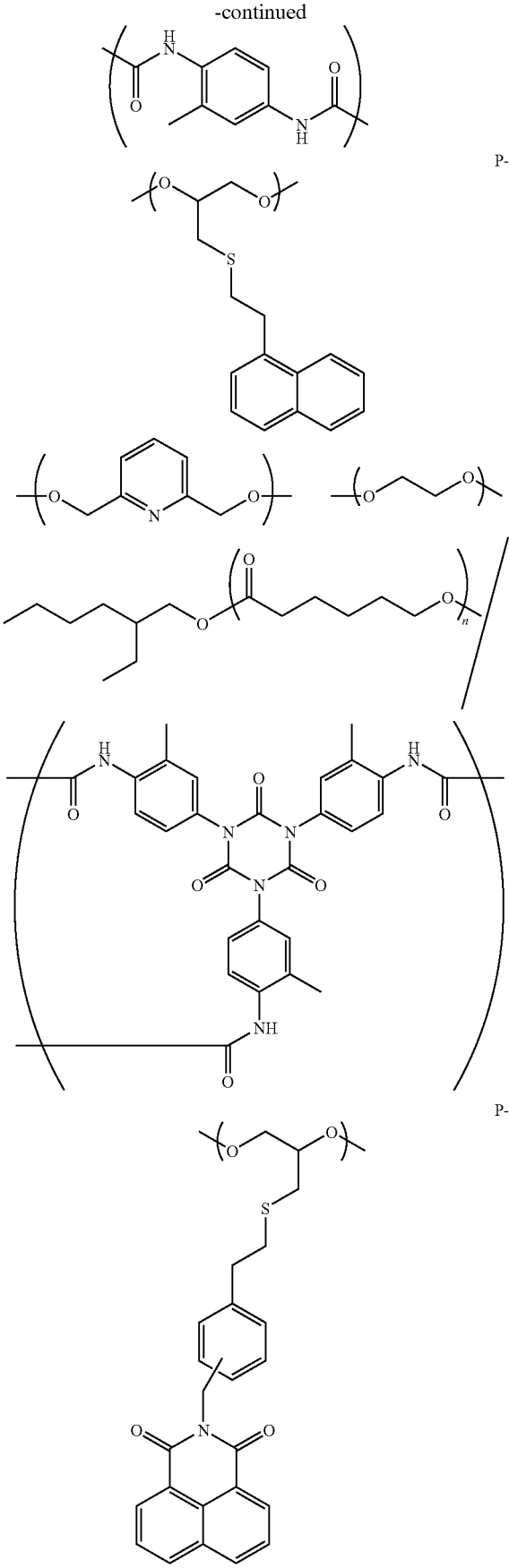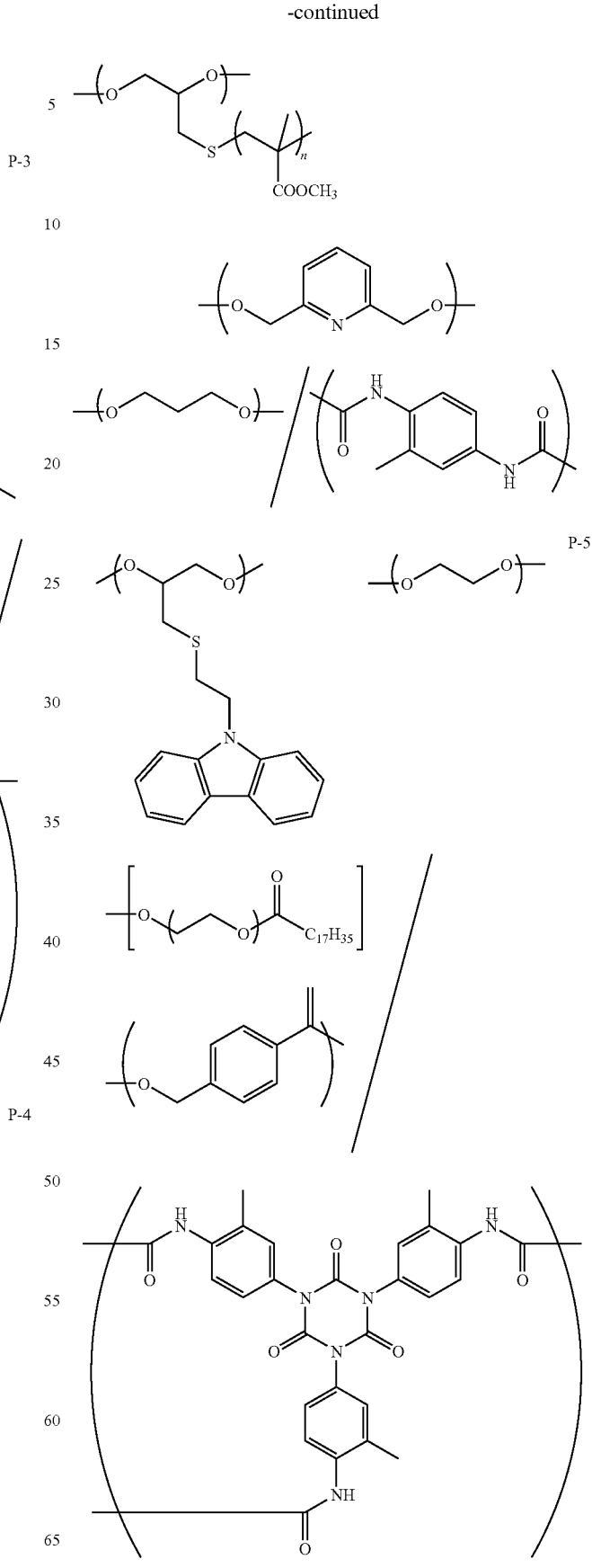

-continued

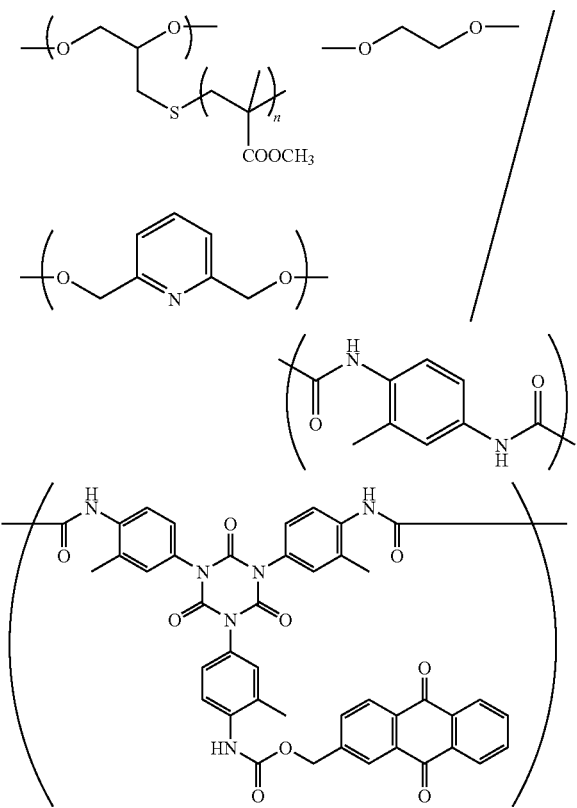

P-6

The pigment dispersion of the invention may contain a single specific polymer compound or two or more types of the specific polymer compounds. The content of the specific polymer compound (b) in the pigment dispersion is preferably from 1 to 100% by weight, more preferably from 5 to 50% by weight, based on the weight of the pigment.

The ink composition of the invention may contain any known pigment dispersing agent in combination with the specific polymer compound (b), as long as the effects are not impaired. The content of the pigment dispersing agent used together is preferably 50% by weight or less of the amount of the specific polymer compound (b).

(a) Pigment

The pigment functions as a coloring material in the pigment dispersion described above, and the ink composition and the curing composition described below. In an embodiment of the invention, the pigment with a very small particle diameter is uniformly and stably dispersed in the dispersion by the function of the specific polymer compound (b), so that the ink composition of the invention described below may form sharp images with good color development and high weather resistance.

The pigment for use in an embodiment of the invention may be of any type and appropriately selected according to the intended use. In view of similarity between the structures of the pigment and the pigment dispersing agent, known organic pigments are preferably used. Examples of the pigment also include the pigments described in Seishiro Itoh Ed., "Ganryo no Jiten (Dictionary of Pigments)" (2000), W. Herbst, K. Hunger, "Industrial Organic Pigments," and JP-A Nos. 2002-12607, 2002-188025, 2003-26978, and 2003-342503.

Examples of the organic pigments include yellow pigments, magenta pigments, cyan pigments, green pigments, orange pigments, brown pigments, violet pigments, black pigments, and so on.

The yellow pigments are pigments showing yellow, examples of which include monoazo pigments, disazo pigments, non-benzidine azo pigments, azo lake pigments, fused azo pigments, acidic dye lake pigments, basic dye lake pigments, anthraquinone pigments, quinophthalone pigments, pyrazolone pigments, acetolone pigments, metal complex salt pigments, nitroso pigments, metal complex azomethine pigments, and benzimidazolone pigments. Among them, examples of pigments that are preferably used in an embodiment of the invention include C.I. Pigment Yellow (hereinafter abbreviated as PY) 1, PY 3, PY 12, PY 13, PY 14, PY 16, PY 17, PY 18, PY 24, PY 60, PY 74, PY 83, PY 93, PY 94, PY 95, PY 97, PY 100, PY 109, PY 110, PY 115, PY 117, PY 120, PY 128, PY 138, PY 139, PY 150, PY 151, PY 153, PY 154, PY 155, PY 166, PY 167, PY 173, PY 175, PY 180, PY 181, PY 185, PY 194, PY 213, PY 214, and PY 219.

The magenta pigments are pigments showing red or magenta, examples of which include monoazo pigments, β-naphthol pigments, disazo pigments, azo lake pigments, fused azo pigments, acidic dye lake pigments, basic dye lake pigments, anthraquinone pigments, thioindigo pigments, perinone pigments, perylene pigments, quinacridone pigments, isoindolinone pigments, alizarin lake pigments, naphtholone pigments, naphthol AS lake pigments, naphthol AS pigments, and diketopyrrolopyrrole pigments.

Among them, examples of pigments that are preferably used in an embodiment of the invention include C.I. Pigment Red (hereinafter abbreviated as PR) 1, PR 2, PR 3, PR 4, PR 5, PR 6, PR 21, PR 38, PR 42, PR 53:1, PR 57:1, PR 52:1, PR 46, PR 48, PR 81, PR 83, PR 88, PR 144, PR 149, PR 166, PR 179, PR 178, PR 190, PR 224, PR 123, PR 19, PR 122, PR 202, PR 207, PR 209, PR 180, PR 83, PR 170, PR 171, PR 172, PR 174, PR 175, PR 176, PR 177, PR 179, PR 185, PR 194, PR 208, PR 214, PR 220, PR 221, PR 242, PR 247, PR 254, PR 255, PR 256, PR 262, PR 268, PR 264, PR 269, and PR 272.

The cyan pigments are pigments showing blue or cyan, examples of which include disazo pigments, phthalocyanine pigments, acidic dye lake pigments, basic dye lake pigments, anthraquinone pigments, and alkali blue pigments. Examples of pigments that are preferably used in an embodiment of the invention include C.I. Pigment Blue (hereinafter abbreviated as PB) 1, PB 15, PB 15:1, PB 15:2, PB 15:3, PB 15:4, PB 15:6, PB 16, PB 18, PB 24, PB 25, PB 60, and PB 79.

The green pigments are pigments showing green, examples of which include phthalocyanine pigments and metal complex pigments. Pigments that are preferably used in an embodiment of the invention include C.I. Pigment Green (hereinafter abbreviated as PG) 7, PG 8, PG 10, and PG 36.

The orange pigments are pigments showing orange, examples of which include isoindolin pigments, anthraquinone pigments, β-naphthol pigments, naphthol AS pigments, isoindolinone pigments, perinone pigments, disazo pigments, quinacridone pigments, acetolone pigments, and pyrazolone pigments. Examples of pigments that are preferably used in an embodiment of the invention include C.I. Pigment Orange (hereinafter abbreviated as PO) 2, PO 3, PO 4, PO 5, PO 13, PO 15, PO 16, PO 22, PO 24, PO 34, PO 36, PO 38, PO 43, PO 48, PO 49, PO 51, PO 55, PO 60, PO 61, PO 62, PO 64, PO 66, PO 72, and PO 74.

The brown pigments are pigments showing brown, examples of which include naphtholone pigments such as C.I. Pigment Brown (hereinafter abbreviated as PBr) 25 and PBr 32.

The violet pigments are pigments showing violet, examples of which include naphtholone pigments, perylene pigments, naphthol AS pigments, and dioxazine pigments. Examples of pigments that are preferably used in an embodiment of the invention include C.I. Pigment Violet (hereinafter abbreviated as PV) 13, PV 17, PV 19, PV 23, PV 29, PV 32, PV 37, and PV 50.

The black pigments are pigments showing black color, examples of which include indazine pigments and perylene pigments. Specifically, PBk 1, PBk 31, and PBk 32 may be used in an embodiment of the invention.

Among these pigments, acetolone pigments such as PY 120, PY 151, PY 154, PY 180, PY 181, PY 194, PO 36, and PO 62; naphthol AS pigments such as PR 170 and PR 187; quinacridone pigments such as PV 19, PR 42, PR 122, PR 202, PR 209, and PR 46; anthraquinone pigments such as PR 251, PR 177, PB 60, and PY 108; and dioxazine pigments such as PV 23 are more preferably used.

The smaller the average particle diameter of the pigment for use in an embodiment of the invention, the better the color development. Therefore, the average particle diameter of the pigment is preferably from 0.01 to 0.4 µm, more preferably from 0.02 to 0.3 µm. The selection of the pigment (a), the specific polymer compound (b), and the dispersion medium, and the setting of the dispersion conditions and post treatment process conditions should be made so that the maximum particle diameter may be 3 µm or less, preferably 2 µm or less. The average particle diameter of the invention uses a median diameter measured with dynamic light scattering device in volumetric basis.

When the pigment dispersion of the invention is used as an inkjet ink composition, the above particle diameter makes it possible to reduce clogging of ink head nozzles and maintain storage stability, transparency and curing sensitivity of the ink. In an embodiment of the invention, the specific polymer compound (b) used has good dispersibility and dispersion stability, and therefore, even when a fine particle pigment is used, a stable and uniform dispersion may be obtained.

The particle diameter of the pigment in the pigment dispersion or the ink composition may be measured by known measurement methods. Specifically, it may be measured by a centrifugal sedimentation light transmission method, an X-ray transmission method, a laser diffraction/scattering method, or a dynamic light scattering method.

For example, the pigment may be dispersed using a known dispersing device such as a ball mill, a sand mill, an attritor, a roll mill, a jet mill, a homogenizer, a paint shaker, a kneader, an agitator, a Henschel mixer, a colloid mill, an ultrasonic homogenizer, a pearl mill, or a wet jet mill.

The process of dispersing the pigment preferably includes adding the specific polymer compound (b). If necessary, the pigment may be added using a synergist as a dispersing aid suitable for each pigment. The dispersing aid is preferably added in an amount of 1 to 10 parts by weight, based on 100 parts by weight of the pigment.

In the preparation of the pigment dispersion of the invention, a solvent may be added as a dispersion medium for the components such as the pigment, or a low-molecular-weight polymerizable compound may be used as a dispersion medium without any solvent.

When a solvent is used as a dispersion medium, a known alcohol solvent, ester solvent, ether solvent, hydrocarbon solvent or the like may be used as the solvent. Preferred examples include alkylene oxide monoalkyl ether, alkylene oxide monoalkyl ether acetate, alkylene glycol diacetate, dialkyl dicarboxylate, (meth)acrylates, and divinyl ethers.

When the pigment dispersion is applied to the radiation-curable ink composition described below, it is preferably solvent-free so that it may be cured after the ink composition is applied to a recording medium. In such a case, therefore, a polymerizable compound may be used as the dispersion medium.

In view of dispersibility, an improvement in handleability of the ink composition and ink jetting property, a polymerizable compound, in particular, a polymerizable compound with lowest viscosity is preferably selected and used as the dispersion medium. The specific polymer compound (b) according to the invention may be produced in a polymerizable composition, so that it may be used without undergoing purification after the preparation. On the other hand, for example, a vinyl polymer is difficult to produce in a polymerizable compound. Therefore, it is not preferred in terms of production suitability, because it needs solvent-free polymerization or a solvent removal process.

The pigment dispersion preferably contains 1 to 40% by weight of the pigment, more preferably 1.5 to 30% by weight of the pigment, based on the solids content of the pigment dispersion. When the pigment dispersion of the invention is used as an ink composition, the pigment dispersion preferably contains 1 to 20% by weight of the pigment, more preferably 1.5 to 15% by weight of the pigment, based on the solids content of the pigment dispersion.

The pigment dispersion of the invention may be used as an ink composition, when mixed with an organic solvent with an affinity to the pigment dispersing agent and/or an aqueous medium with an affinity to the pigment dispersing agent or mixed with an additive suitable for the intended use. The pigment dispersion of the invention may contain a finely dispersed pigment and therefore has good color developing properties. In addition, the pigment dispersion of the invention allows low-viscosity dispersion and therefore has high fluidity. The pigment dispersion of the invention is also less likely to cause precipitation or aggregation and therefore has good storage stability. Because of these performances, the pigment dispersion of the invention is suitable for use in ink compositions for drawing or printing of images and characters, such as inkjet ink compositions, writing ink compositions, and printing ink compositions. An ink composition with low viscosity and high viscosity stability may be produced using the pigment dispersion of the invention. Therefore, the pigment dispersion of the invention is preferably used for inkjet ink compositions, which need strict control of viscosity.

Ink Composition

The ink composition of the invention contains the pigment dispersion of the invention.

The ink composition containing the pigment dispersion of the invention may be of any type as long as containing a pigment as a colorant.

Curable Composition

The use of the pigment dispersion of the invention allows fine and stable dispersion of the pigment even in the so-called polymerizable compound having a polymerizable functional group such as an ethylenic double bond or a cyclic ether moiety. Therefore, the pigment dispersion of the invention is also preferably used for a curable composition.

The curable composition is a composition capable of being cured by the application of energy such as heat or light. The curable composition preferably contains a polymerization initiator. When it contains a thermal polymerization initiator, it may be well cured by heating. When it contains a photopolymerization initiator, it may be cured by the application of an active energy ray.

The active energy ray may be any type of energy ray that may provide energy capable of generating an initiator in the curable composition irradiated with it, and includes any of rays in a wide range, such as α-rays, γ-rays, X-rays, ultraviolet rays, visible rays, and electron beams. Particularly, in view of curing sensitivity and easy availability of equipment, ultraviolet rays and electron beams are preferred, and ultraviolet rays are more preferred. Therefore, the curable composition of the invention is preferably curable by the application of ultraviolet light as a radiation. A mercury lamp, a metal halide lamp, a light-emitting diode, a semiconductor laser, a fluorescent lamp, or the like may be used as a source of ultraviolet light. In an embodiment of the invention, a mercury lamp, a metal halide lamp, or a light-emitting diode is preferably used as a light source, which preferably has an emission wavelength of 300 nm to 400 nm.

Because of the features described above, the pigment dispersion of the invention is preferably used for a curable ink composition, most preferably for a curable inkjet ink composition.

The curable composition of the invention includes the pigment dispersion of the invention and (c) a polymerizable compound.

<(c) Polymerizable Compound>

The polymerizable compound for use in an embodiment of the invention may be any compound that may cause a polymerization reaction upon the application of certain energy so that it may be cured, regardless of whether it is a monomer, oligomer or polymer species. In particular, the polymerizable compound is preferably any of various polymerizable monomers known as radically or cationically photopolymerizable compounds, which may cause a polymerization reaction with an initiator derived from a polymerization initiator added as needed.

A single polymerizable compound or a mixture of two or more polymerizable compounds may be used to control the rate of reaction, physical properties of the ink composition, the physical properties of the cured film, and so on. The polymerizable compound may be a monofunctional or polyfunctional compound.

In an embodiment of the invention, the polymerizable compound to be used may also be any of various known radically polymerizable compounds capable of causing a polymerization reaction with an initiator derived from a photo-radical initiator.

Examples of known radically polymerizable compounds that may be used in an embodiment of the invention include (meth)acrylate compounds, (meth)acrylamide compounds, vinyl ether compounds, styrene compounds, and N-vinyl compounds as described in JP-A Nos. 2008-208190 and 2008-266561. In the description, the expression "(meth)acrylate" is used to refer to one or both of "acrylate" and "methacrylate," and the expression "(meth)acryl" is used to refer to one or both of "acryl" and "methacryl."

Among these, one or more monomers selected from (meth)acrylate compounds, (meth)acrylamide compounds, vinyl ether compounds, and N-vinyl compounds are preferably used as the radically polymerizable compounds in an embodiment of the invention. In view of the curing speed, the ink composition viscosity, and the physical properties of the printed sample film, a polyfunctional polymerizable monomer having two or more polymerizable functional groups is also preferably used in combination with a monofunctional polymerizable monomer.

Examples of cationically polymerizable monomers that may be used as the polymerizable compounds in an embodiment of the invention include epoxy compounds, vinyl ether compounds and oxetane compounds as described in JP-A Nos. 06-9714, 2001-220526, 2001-40068, 2001-55507, 2001-310938, 2001-310937, 2001-220526, 2001-31892, 2003-341217, and 2008-266561.

A single compound or a combination of two or more compounds may be used as the cationically polymerizable monomer in the curable composition of the invention. In order to effectively reduce the shrinkage during the process of curing the ink composition, at least one oxetane compound is preferably used in combination with at least one compound selected from an epoxy compound and a vinyl ether compound.

The content of the polymerizable compound in the curable composition is preferably from 50 to 95% by weight, more preferably from 60 to 92% by weight, even more preferably from 70 to 90% by weight, based on the total amount of the composition. In the above range, good curing properties may be obtained.

In terms of improving the curing sensitivity, a polymerization initiator is also preferably used in the curable composition of the invention.

<Polymerization Initiator>

The curable composition of the invention preferably contains a polymerization initiator for radical or cationic polymerization, more preferably contains a photopolymerization initiator.

In an embodiment of the invention, the photopolymerization initiator is a compound that undergoes a chemical change to produce at least one of a radical, an acid and a base, through the action of light or the interaction with the electronically excited state of a sensitizing dye.

An appropriate photopolymerization initiator sensitive to the active ray to be applied, such as ultraviolet light with a wavelength of 200 to 400 nm, far ultraviolet light, g line, h line, i line, KrF excimer laser beam, electron beam, X-ray, molecular beam, or ion beam, may be selected and used.

Any photopolymerization initiator known to those skilled in the art may be used. Examples include many photopolymerization initiators as described in Bruce M. Monroe et al., Chemical Revue, 93, 435 (1993); R. S. Davidson, Journal of Photochemistry and Biology A: Chemistry, 73.81 (1993); J. P. Faussier, "Photoinitiated Polymerization-Theory and Applications": Papra Review Vol. 9, Report, Papra Technology (1998); and M. Tsunooka et al., Prog. Polym. Sci., 21, 1 (1996). Compounds for use in chemical amplification resists or cationic photopolymerization as described in "Imaging yo Yuki Zairyo (Imaging Organic Materials)" compiled by The Japanese Research Association for Organic Electronics Materials and published by Bun-shin Shuppan (1993), pp. 187-192 may also be used. A group of compounds capable of causing oxidative or reductive bond cleavage through interaction with the electronically excited state of a sensitizing dye are also known, as described in F. D. Saeva, Topics in Current Chemistry, 156, 59 (1990); G. G. Maslak, Topics in Current Chemistry, 168, 1 (1993); H. B. Shuster et al., JACS, 112, 6329 (1990); and I. D. F. Eaton et al., JACS, 102, 3298 (1980).

For example, the photopolymerization initiator described in JP-A No. 2008-208190 or 2008-266561 may be used. Photopolymerization initiators are preferably aromatic ketones, aromatic onium salt compounds, organic peroxides, hexaarylbiimidazole compounds, ketoxime ester compounds, borate compounds, azinium compounds, metallocene compounds, active ester compounds, or carbon-halogen bond-containing compounds, in particular, preferably aromatic ketones, ketoxime salt compounds, or aromatic onium salt compounds.

A single photopolymerization initiator or a combination of two or more photopolymerization initiators may be used as the polymerization initiator.

The content of the photopolymerization initiator in the curable composition is preferably from 0.1 to 20% by weight, more preferably from 0.5 to 15% by weight, even more preferably from 1 to 10% by weight.

(Other Components)
(Sensitizing Dye)

A sensitizing dye for increasing the sensitivity of the photopolymerization initiator may be added to the curable composition of the invention. Preferred sensitizing dyes belong to the compound groups listed below and have an absorption wavelength in the range of 350 nm to 450 nm.

Examples of sensitizing dyes include polycyclic aromatics (e.g., pyrene, perylene, triphenylene, and anthracene), xanthenes (e.g., fluorescein, eosin, erythrosine, rhodamine B, and rose bengal), cyanines (e.g., thiacarbocyanine and oxacarbocyanine), melocyanines (e.g., melocyanine and carbomelocyanine), thiazines (e.g., thionine, methylene blue, and toluidine blue), acridines (e.g., acridine orange, chloroflavin, and acriflavin), anthraquinones (e.g., anthraquinone), squariums (e.g., squarium), and coumarins (e.g., 7-diethylamino-4-methylcoumarin).

The sensitizing dye is more preferably a compound represented by each of Formulae (IX) to (XIII) below.

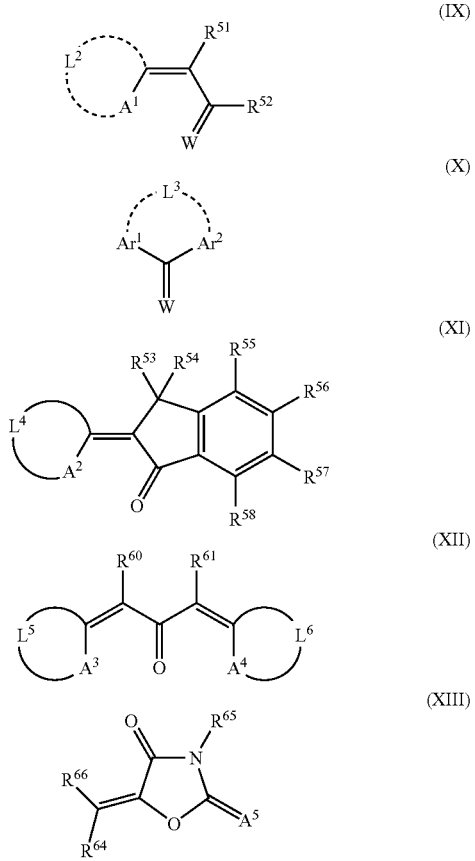

In Formula (XI), $A^1$ represents a sulfur atom or $—NR^{50}—$, wherein $R^{50}$ represents an alkyl group or an aryl group, $L^2$ represents a non-metallic atomic group that forms a basic dye nucleus together with $A^2$ adjacent thereto and the adjacent carbon atom, $R^{51}$ and $R^{52}$ each independently represent a hydrogen atom or a monovalent non-metallic atomic group, $R^{51}$ and $R^{52}$ may be bonded to each other to form an acidic dye nucleus, and W represents an oxygen atom or a sulfur atom.

In Formula (X), $Ar^1$ and $Ar^2$ each independently represent an aryl group and linked to each other through a bonding moiety represented by $L^3$, wherein $L^3$ represents —O— or —S—, and W has the same meaning as defined in Formula (IX).

In Formula (XI), $A^2$ represents a sulfur atom or $NR^{59}$, $L^4$ represents a non-metallic atomic group that forms a basic dye nucleus together with $A^2$ adjacent thereto and the adjacent carbon atom, $R^{53}$, $R^{54}$, $R^{55}$, $R^{56}$, $R^{57}$, and $R^{58}$ each independently represent a monovalent non-metallic atomic group, and $R^{59}$ represents an alkyl group or an aryl group.

In Formula (XII), $A^3$ and $A^4$ each independently represent —S—, $—NR^{62}—$, or $—NR^{63}—$, wherein $R^{62}$ and $R^{63}$ each independently represent a substituted or unsubstituted alkyl group or a substituted or unsubstituted aryl group, $L^5$ and $L^6$ each independently represent a non-metallic atomic group that forms a basic dye nucleus together with $A^3$ or $A^4$ adjacent thereto and the adjacent carbon atom, and $R^{60}$ and $R^{61}$ each independently represent a hydrogen atom or a monovalent non-metallic atomic group or may be bonded to each other to form an aliphatic or aromatic ring.

In Formula (XIII), $R^{66}$ represents an aromatic or heterocyclic ring optionally having a substituent, $A^5$ represents an oxygen atom, a sulfur atom or $—NR^{67}—$, $R^{64}$, $R^{65}$ and $R^{67}$ each independently represent a hydrogen atom or a monovalent non-metallic atomic group, and $R^{67}$ and $R^{64}$ or $R^{65}$ and $R^{67}$ may be bonded to each other to form an aliphatic or aromatic ring.

Preferred examples of the compounds represented by Formulae (IX) to (XIII), respectively, include Exemplary Compounds (A-1) to (A-24) shown below.

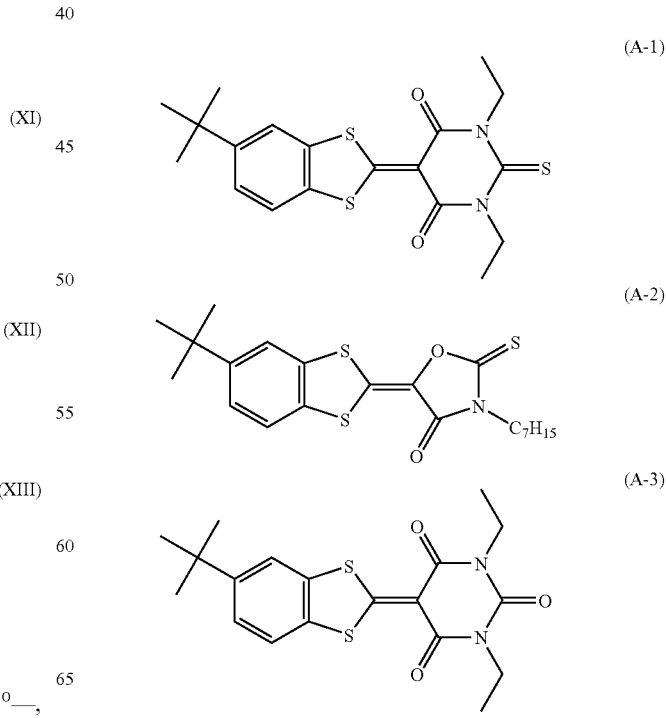

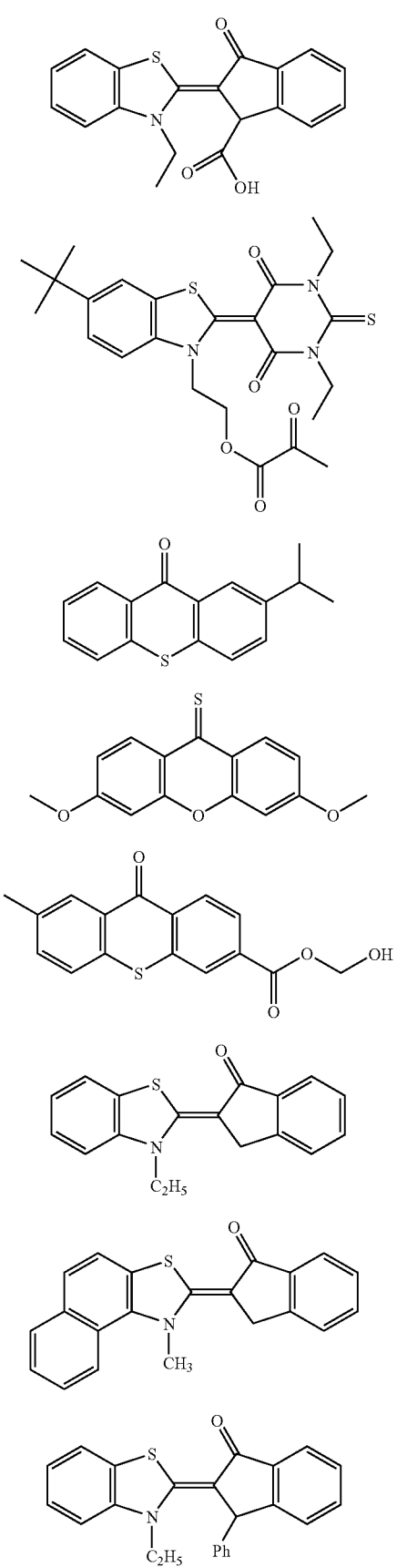
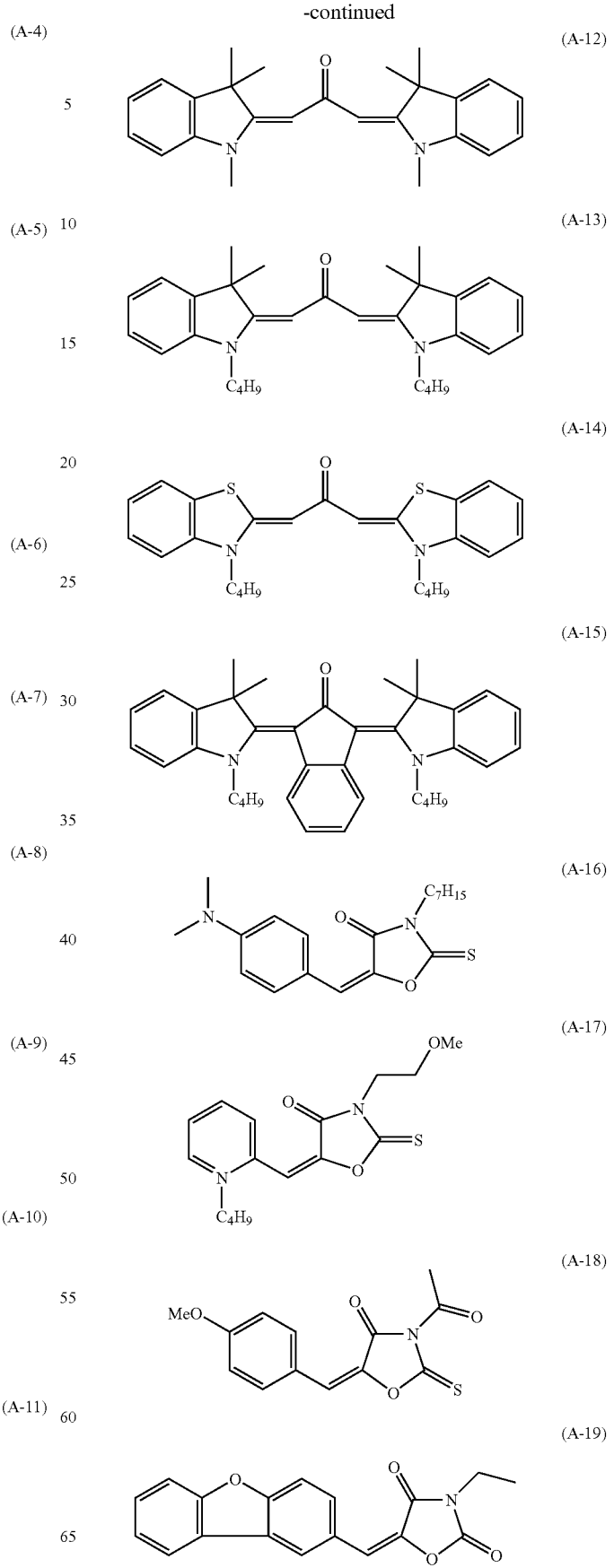

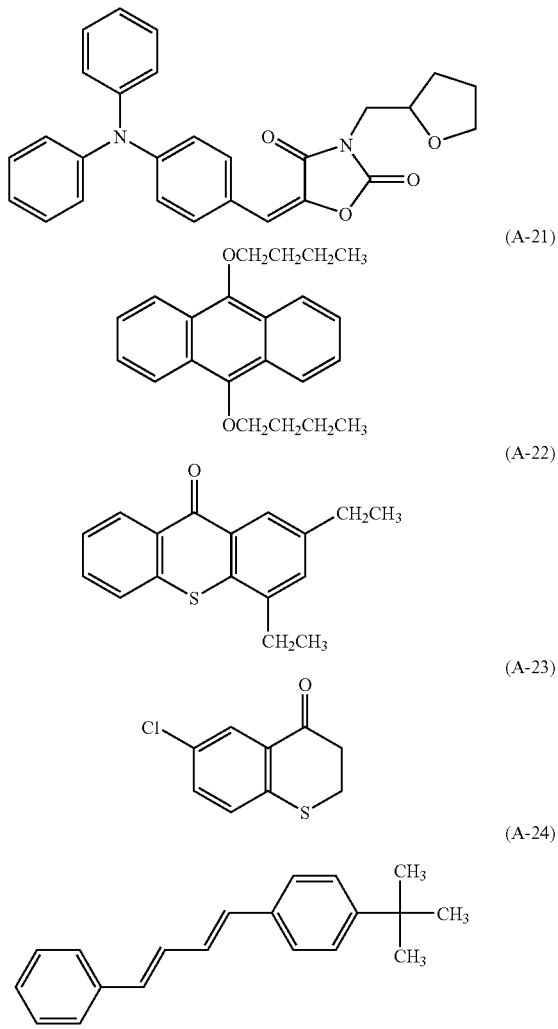

(Co-Sensitizing Agent)

A known compound having the function of further increasing the sensitivity or preventing oxygen from inhibiting polymerization may be further added as a co-sensitizing agent to the curable composition of the invention.

Examples of such a co-sensitizing agent include amines and compounds as described in M. R. Sander et al., Journal of Polymer Society, Vol. 10, 3172 (1972), Japanese Patent Application Publication (JP-B) No. 44-20189, JP-A Nos. 51-82102, 52-134692, 59-138205, 60-84305, 62-18537, and 64-33104, and Research Disclosure No. 33825. More specifically, examples include triethanolamine, ethyl p-dimethylaminobenzoate, p-formyldimethylaniline, and p-methylthiodimethylaniline.

Other co-sensitizing agents include thiols and sulfides such as thiol compounds as described in JP-A No. 53-702, JP-B No. 55-500806, and JP-A No. 05-142772 and disulfide compounds as described in JP-A No. 56-75643, more specifically, 2-mercaptobenzothiazole, 2-mercaptobenzoxazole, 2-mercaptobenzimidazole, 2-mercapto-4(3H)-quinazoline, and β-mercaptonaphthalene.

Other co-sensitizing agents further include amino acid compounds (e.g., N-phenylglycine), organometallic compounds as described in JP-B No. 48-42965 (e.g., tributyltin acetate), hydrogen donors as described in JP-B No. 55-34414, sulfur compounds as described in JP-A No. 06-308727 (e.g., trithiane), phosphorous compounds as described in JP-A No. 06-250387 (e.g., diethyl phosphite), and Si—H or Ge—H compounds.

Depending on the purpose, the curable composition of the invention may contain various additives in combination with the essential components (the pigment, the specific polymer compound and the polymerizable compound) and preferred optional components such as the polymerization initiator and the sensitizing dye and the co-sensitizing agent used together with the polymerization initiator. For example, an ultraviolet absorbing agent may be used to improve the weather resistance of the resulting image or prevent fading. An antioxidant may also be used to increase the stability of the ink composition.

Additives that may be used in the curable composition of the invention are described below.

The curable composition of the invention may contain any of various organic or metal-complex anti-fading agents; a conductive salt for controlling the jetting properties, such as potassium thiocyanate, lithium nitrate, ammonium thiocyanate, or dimethylamine hydrochloride salt; or a trace amount of an organic solvent for improving the adhesion to the recording medium.

The curable composition of the invention may contain any of various polymer compounds for controlling the film properties. Examples of such polymer compounds include acrylic polymers, polyvinyl butyral resins, polyurethane resins, polyamide resins, polyester resins, epoxy resins, phenol resins, polycarbonate resins, polyvinyl butyral resins, polyvinyl formal resins, shellac, vinyl resins, acrylic resins, rubber resin, waxes, and other natural resins. These compounds may be used in combination of two or more thereof.

To control the liquid properties, a nonionic surfactant, a cationic surfactant, or an organic fluoro-compound may also be added to the curable composition of the invention.

If necessary, any other additive such as a leveling additive, a matting agent, a wax for controlling the film properties, or a non-polymerization-inhibiting tackifier for improving the adhesion to such a recording medium as polyolefin or PET may also be added.

The curable composition of the invention prepared as described above is a curable coloring composition containing a uniformly and stably dispersed pigment as a colorant, in which even fine pigment particles are prevented from being aggregated or precipitated and uniformly dispersed effectively in a sustained manner, so that good color development may be achieved. Therefore, such a curable coloring composition is suitable for use in wide-field applications requiring good color development or requiring a light-resistant colorant, such as a curable ink composition, a nano-imprint composition, and a surface coating agent.

Curable Ink Composition

A curable ink composition, which is the most suitable application of the curable composition of the invention will be described below. The curable ink composition of the invention includes the curable composition of the invention described above.

The curable ink composition produced with the curable composition may be cured with high sensitivity by active energy rays and does not have the risk of an increase in viscosity or a reduction in coloring ability, which is caused by a reduction in the dispersion stability of the pigment. Therefore, the curable ink composition is preferably used for an inkjet ink composition applicable to an inkjet recording method requiring viscosity stability.

In view of the jetting property of the ink composition, the curable ink composition of the invention for use in inkjet recording preferably has a viscosity of 30 mPa·s or less, more preferably 20 mPa·s or less at the jetting temperature. If necessary, the composition ratio is preferably controlled and determined so that the viscosity may fall within the above range.

The viscosity of the ink composition at 25° C. (room temperature) should be from 0.5 mPa·s to 200 mPa·s, preferably from 1 mPa·s to 100 mPa·s, more preferably from 2 mPa·s to 50 mPa·s. When the viscosity at room temperature is set relatively high, penetration of the ink into a recording medium may be prevented even in a case where the recording medium used is porous, so that the uncured monomer and the smell may be reduced and that blurring of dots may also be reduced during the deposition of ink droplets, which leads to an improvement in image quality. If the viscosity of the ink composition is higher than 200 mPa·s at 25° C., the delivery of the ink liquid may cause a problem.

The curable ink composition of the invention preferably has a surface tension of 20 to 40 mN/m, more preferably 23 to 35 mN/m. When recording is performed on various recording media such as polyolefin, PET, coated paper, and non-coated paper, the surface tension is preferably 20 mN/m or more in view of bleeding and penetration, and preferably 35 mN/m or less in view of wettability.

The curable ink composition of the invention adjusted as described above is suitable for use as an inkjet recording ink composition. The ink composition may be printed onto a recording medium from an inkjet printer and then irradiated with radiation so that it is cured for recording.

The print produced with the ink composition has an image portion that is cured by the application of radiation such as ultraviolet light and therefore has high strength. Therefore, the ink composition may be used not only for image formation but also for various other applications such as the formation of ink receiving layers (image portions) for planographic printing plate.

The curable ink composition containing the pigment dispersion of the invention is preferably used for an inkjet ink composition. Next, an inkjet recording method and an inkjet recording apparatus applicable to this case will be described below.

(Inkjet Recording Method)

An ink recording method preferably includes heating the ink composition to 40 to 80° C. so that the ink composition may have a viscosity of 30 mPa·s or less and then jetting the ink composition. Using this method makes it possible to achieve high jetting stability.

In general, a radiation-curable ink composition has a viscosity higher than that of an aqueous ink composition, and therefore, the viscosity of the radiation-curable ink composition may fluctuate in a relatively wide range due to temperature fluctuations during printing. The fluctuations in the viscosity of the ink composition have a significant effect directly on the size of droplets and the droplet jetting speed and may cause image quality degradation. Therefore, the temperature of the ink composition should be kept as constant as possible during printing. The temperature of the ink composition is preferably controlled to fall within the range of the set temperature ±5° C., more preferably the set temperature ±2° C., even more preferably the set temperature ±1° C.

A feature of an inkjet recording apparatus for use in the inkjet recording method is that it has unit for stabilizing the ink composition temperature. All piping systems and components from an ink tank (an intermediate tank, if any) to a jetting nozzle face are targeted for keeping a constant temperature.

For example, a temperature control method include, but is not limited to, placing temperature sensors at the respective piping portions and controlling heating in response to the ink composition flow rate and the environmental temperature. In addition, the head unit to be heated is preferably thermally blocked or insulated so that the main component of the apparatus may be unaffected by the ambient temperature. In order to reduce the start-up time required to heat up a printer or reduce heat energy loss, the heating unit is preferably thermally insulated from other components and entirely reduced in heat capacity.

An active energy-curable ink composition may be prepared by adding a photopolymerization initiator as the polymerization initiator to the ink composition of the invention.

The conditions for the application of active energy rays to such an ink composition will be described below. JP-A No. 60-132767 discloses a basic irradiation method. Specifically, such a method include placing light sources on both sides of a head unit, performing shuttle scanning with the head and the light sources, performing irradiation a certain time after the ink deposition, and completing curing with another non-driving light source. WO99/54415 discloses an irradiation method including using optical fibers or collimating light from a light source and applying the collimated light to the surface of a mirror placed on the side of a head unit to apply UV light to a recording part. In an embodiment of the invention, these irradiation methods may be used.

When the ink composition of the invention is used, it is preferred that the ink composition should be heated to a constant temperature and that the time between the deposition and the irradiation should be from 0.01 to 0.5 seconds, more preferably from 0.01 to 0.3 seconds, even more preferably radiation should be applied 0.01 to 0.15 seconds after the deposition. When the time between the deposition and the irradiation is controlled to be very short in this manner, the deposited ink may be prevented from blurring before curing.

In addition, when a porous recording medium is used, the ink composition may be exposed to light before it penetrates to a deep portion which light from the light source may not reach. In this case, therefore, the unreacted monomer may be prevented from remaining, so that the odor may be reduced.

When the inkjet recording method is used with the curable ink composition of the invention, a significant synergistic effect is produced. In particular, a significant effect may be obtained when the ink composition used has a viscosity of 200 mPa·s or less at 25° C.

The use of such an inkjet recording method makes it possible to keep the deposited ink diameter constant even on various recording media different in surface wettability, which leads to an image quality improvement. When a color image is produced, colors are preferably stacked in the order from low brightness color to high brightness color. If low brightness colors are stacked, it may be difficult for irradiation to reach a lower part of the ink, so that inhibition of the curing sensitivity, an increase in the monomer residue, the generation of a odor, and degradation of the adhesion may be more likely to occur. All colors may be jetted and then exposed to light at a time. If view of curing acceleration, however, colors are preferably exposed to light one by one.

In an embodiment of the invention, any commercially available inkjet recording apparatus may be used. In an embodiment of the invention, therefore, a commercially available inkjet recording apparatus may be used for recording on a recording medium (printing material).

Under the preferred jetting conditions described above, the ink composition of the invention undergoes cycles of heating and cooling. Even when the ink composition of the invention is placed under such temperature conditions, the pigment dispersing agent functions to suppress a reduction in pigment dispersibility, so that good color development is obtained over a long period of time, and therefore, the ink composition is also advantageous in that a pigment aggregation-induced reduction in jetting property may also be prevented.

(Recording Medium)

The ink composition of the invention may be applicable to any recording medium, examples of which include paper such as regular non-coated paper or coated paper; various non-absorbent resin materials for use in so-called soft packaging, or resin films produced by shaping the resin materials into films; and various plastic films such as PET films, OPS films, OPP films, ONy films, PVC films, PE films, and TAC films. Other plastics that may be used as recording medium materials include polycarbonate, acrylic resins, ABS, polyacetal, PVA, and rubbers. Metals and glass materials may also be used for recording media.

(Printed Product)

A printed product may be obtained by a process including printing the curable ink composition of the invention onto a recording medium from an inkjet printer and then preferably applying active energy rays to the printed ink composition to cure it. Since the curable ink composition of the invention used in image forming contains uniformly and stably dispersed pigment fine particles, the printed product produced with the curable ink composition of the invention has a high-quality image with a high level of color development and sharpness and also with high weather resistance. Therefore, the printed product is applicable in a wide field.

Illustrative, non-limiting embodiments of the invention are listed below.

<1> A pigment dispersion, comprising:
(a) a pigment; and
(b) a polymer compound as a dispersant for the pigment (a),
wherein the polymer compound comprises a urethane bond in a main chain, comprises a pendant moiety comprising a skeleton which is the same as a partial skeleton of the pigment (a), and further comprises, at a side chain, at least one polymer chain selected from the group consisting of a polyester chain, a poly(meth)acrylate chain, and a polyalkylene oxide chain, and
wherein the molecular weight of the skeleton which is the same as a partial skeleton of the pigment (a) is from 20 to 70% of the molecular weight of the pigment (a).

<2> The pigment dispersion of <1>, wherein the weight average molecular weight of the polymer compound is from 5,000 to 200,000.

<3> The pigment dispersion of <1> or <2>, wherein the average particle diameter of the pigment is from 0.01 μm to 0.4 μm.

<4> The pigment dispersion any one of <1> to <3>, wherein the pigment is included in the pigment dispersion at an amount of from 1 to 40% by weight with respect to the total solid content of the pigment dispersion.

<5> An ink composition, comprising the pigment dispersion of any one of <1> to <4>.

<6> A curable composition, comprising the pigment dispersion of any one of <1> to <4> and (c) a polymerizable compound.

<7> A curable ink composition, comprising the curable composition of <6>.

<8> A method for manufacturing the pigment dispersion of any one of <1> to <4>, the method comprising:
preparing the polymer compound by reacting
(i) a derivative having one or two hydroxyl groups or one or two isocyanate groups, and having a skeleton that is the same as a partial skeleton of the pigment,
(ii) one of a polyester having one or two hydroxyl groups at the terminal, a poly(meth)acrylate having one or two hydroxyl groups at the terminal or a polyalkylene oxide having one or two hydroxyl groups at the terminal, and
(iii) a bifunctional or polyfunctional isocyanate compound, and
dispersing the pigment and the polymer compound.

EXAMPLES

The invention is more specifically described by the examples below, which are not intended to limit the scope of the present invention.

The molecular weight of the polymer in each synthetic example shown below was determined by GPC (trade name: HLC-8220GPC, manufactured by TOSOH CORPORATION), as a weight average molecular weight. The GPC measurement was performed at 40° C. and a flow rate of 0.5 mL/second using three coupled columns (trade name: TSK-gel Super AWMHH, manufactured by TOSOH CORPORATION) and N-methylpyrrolidone as an eluent. The molecular weight was calculated through a comparison with standard polystyrenes.

Synthesis Example 1

Synthesis of Compound M-1

In 84 g of dimethyl sulfoxide (manufactured by Wako Pure Chemical Industries, Ltd.) were dissolved 15 g of 9(10H) acridone (manufactured by Wako Pure Chemical Industries, Ltd.) and 3.4 g of sodium hydroxide (manufactured by Wako Pure Chemical Industries, Ltd.) and the resultant was heated at 45° C. Thereto was dropwise added 17.6 parts by weight of CMS-P (chloromethylstyrene, manufactured by AGC SEIMI CHEMICAL CO., LTD.) and the resultant was further heated and stirred at 50° C. for 5 hours. This reaction liquid was poured into a mixed solution of 30 g of distilled water and 30 g of methanol (manufactured by Wako Pure Chemical Industries, Ltd.) while stirring. The resulting precipitate was separated by filtration and washed with 300 g of a mixed solution of distilled water and methanol at equal weights. The resulting solid was dried under reduced pressure to give 17.5 g of 10-[(styrenyl)methyl]-9-acridanone as a pale yellow solid. Then, 175 g of N-methylpyrrolidone (manufactured by Wako Pure Chemical Industries, Ltd.) was added to the 17.5 g of 10-[(styrenyl)methyl]-9-acridanone and 60.9 g of thioglycerol (manufactured by Sigma Aldrich Co.). This mixture was heated to 65° C. under a nitrogen atmosphere and stirred for 30 minutes, and then 0.14 g of V-65 (2,2'-azobis(2,4-dimethylvaleronitrile) (manufactured by Wako Pure Chemical Industries, Ltd.) was added thereto and stirred for 2 hours. To this reaction solution was added 500 g of a mixed solvent of water and methanol (1:1 in weight ratio). The precipitated crystal was separated by filtration and washed with 100 g of methanol. The resulting solid was dried under reduced pressure to give 22.0 g of Compound M-1 as a pale yellow solid.

Synthesis Example 2

Synthesis of Compound M-6

First, 175 g of N-methylpyrrolidone was added to 10.9 g of N-vinylcarbazole (manufactured by Tokyo Chemical Industry Co., Ltd.) and 60.9 g of thioglycerol. The mixture was heated to 65° C. under a nitrogen atmosphere and stirred for 30 minute, and then 0.14 g of V-65 (2,2'-azobis(2,4-dimethylvaleronitrile), manufactured by Wako Pure Chemical Industries, Ltd.) was added thereto and stirred for 2 hours. To the reaction solution was added 550 g of a mixed solvent of water and methanol (1:1 in weight ratio). The precipitated crystal was separated by filtration and washed with 100 g of methanol. The resulting solid was dried under reduced pressure to give 14.0 g of Compound M-6 as a white solid.

Synthesis Example 3

Synthesis of Compound B-1

Into a nitrogen purged three-neck flask were introduced 120 g of a dibasic ester (DBE)(CH$_3$O$_2$C(CH$_2$)$_n$CO$_2$CH$_3$, n=2 to 4) (manufactured by INVISTA JAPAN K.K.), 100 g of methyl methacrylate (manufactured by Wako Pure Chemical Industries, Ltd.) and 2.2 g of thioglycerol. The mixture was stirred with an agitator (trade name: Three-One Motor, manufactured by Shinto Scientific Co., Ltd.) and heated to 105° C., while nitrogen was blown into the flask. After 0.262 g of VA-086 (2,2'-azobis[2-methyl-N-(2-hydroxyethyl)-propionamide], manufactured by Wako Pure Chemical Industries, Ltd. was added, the mixture was stirred for 2 hours. Then, 0.131 g of VA-086 was further added, and the mixture was heated and stirred at 115° C. for 4 hours. After the reaction solution was allowed to cool at room temperature, 100 g of DBE was added thereto, and the mixture was poured into 6,000 g of n-hexane. The precipitated solid was separated by filtration and dried under reduced pressure to give 99.1 g of a diol-terminated poly(methyl methacrylate) (Compound B-1) (6,000 in weight average molecular weight).

Synthesis Example 4

Synthesis of Compound B-5

First, 22.8 g of 2-ethylhexanol and 0.1 g of monobutyltin oxide were added to 200 g of ε-caprolactone and the mixture was stirred for 5 hours under a nitrogen atmosphere. The mixture was then heated to 110° C. and stirred for 1 hour. After the mixture was cooled to room temperature, 800 g of acetone was added thereto, and the product was re-precipitated in 10 kg of a mixed solvent of water and methanol (1:1 in weight ratio). The resulting polymer was separated by filtration to give 150 g of Compound B-5.

Polyethylene glycol monostearate (25EO) (manufactured by Wako Pure Chemical Industries, Ltd.) was used as Compound B-6.

Synthesis Example 5

Synthesis of DVE-3 Solution of Specific Polymer Compound (P-1)

A mixture of 195 g of DVE-3 (triethylene glycol divinyl ether, manufactured by BASF Japan Ltd.), 9.0 g of Compound M-1, 64.3 g of Compound B-1, 18.0 g of TDI (tolylene diisocyanate, manufactured by Tokyo Chemical Industry Co., Ltd.), 3.1 g of PDM (2,6-pyridinedimethanol, manufactured by Sigma-Aldrich Co.), and 5.7 g of DEG (diethylene glycol, manufactured by Wako Pure Chemical Industries, Ltd.) was prepared and stirred at 60° C. A solution of 0.04 g of Stanoct (stannous octylate, manufactured by API Corporation) in 5 g of DVE-3 was further added to the mixture and stirred for 4 hours, so that a solution of Specific Polymer Compound P-1 (pigment dispersing agent, 120,000 in weight average molecular weight) in DVE-3 was obtained.

Synthesis Example 6

Synthesis of DVE-3 Solution of Specific Polymer Compound (P-3)

A mixture of 195 g of DVE-3, 7.7 g of Compound M-1, 44.2 g of Compound B-5, 38.5 g of MITEC GP770A (trifunctional isocyanate, manufactured by Mitsubishi Chemical Corporation), 7.2 g of PDM, and 2.3 g of DEG was prepared. After the solvent of MITEC GP770A was removed by distillation under reduced pressure, the mixture was heated to 60° C. A solution of 0.04 g of Stanoct in 5 g of DVE-3 was added to the mixture and stirred for 4 hours, so that a DVE-3 solution of Specific Polymer Compound P-3 (pigment dispersing agent, 45,000 in weight average molecular weight) was obtained.

Synthesis Example 7

Synthesis of DVE-3 Solution of Specific Polymer Compound (P-5)

A mixture of 195 g of DVE-3, 7.1 g of Compound M-6, 24.5 g of Compound B-6, 49.3 g of MITEC GP770A, 11.5 g of HMBA ((4-hydroxymethyl)benzoic acid, manufactured by Sigma-Aldrich Co.), and 7.5 g of DEG was prepared. After the solvent of MITEC GP770A was removed by distillation under reduced pressure, the mixture was heated to 60° C. A solution of 0.04 g of Stanoct in 5 g of DVE-3 was added to the mixture and stirred for 4 hours, so that a DVE-3 solution of Specific Polymer Compound P-5 (pigment dispersing agent, 60,000 in weight average molecular weight) was obtained.

Synthesis Example 8

Synthesis of DVE-3 Solution of Comparative Polymer (P-8)

A mixture of 195 g of DVE-3, 24.9 g of Compound B-6, 55.5 g of MITEC GP770A, 12.6 g of HMBA, and 7.0 g of DEG was prepared. After the solvent of MITEC GP770A was removed by distillation under reduced pressure, the mixture was heated to 60° C. A solution of 0.04 g of Stanoct in 5 g of DVE-3 was added to the mixture and stirred for 4 hours, so that a DVE-3 solution of Comparative Polymer P-8 (42,000 in weight average molecular weight, which was a pigment dispersing agent with no partial pigment skeleton).

Synthesis Example 9

Synthesis of DVE-3 Solution of Comparative Polymer (P-9)

Into nitrogen purged three-neck flask were introduced 100 g of DBE (manufactured by Wako Pure Chemical Industries, Ltd.), 100 g of styrene (manufactured by Wako Pure Chemical Industries, Ltd.) and 2.2 g of thioglycerol. The mixture was stirred with an agitator (trade name: Three-One Motor, manufactured by Shinto Scientific Co., Ltd.) and heated to 105° C., while nitrogen was blown into the flask. After 0.262 g of VA-086 (2,2'-azobis[2-methyl-N-(2-hydroxyethyl)-propionamide], manufactured by Wako Pure Chemical Industries, Ltd. was added, the mixture was stirred for 2 hours.

Then, 0.131 g of VA-086 was further added, and the mixture was heated and stirred at 115° C. for 4 hours. After the reaction solution was allowed to cool at room temperature, 100 g of DBE was added thereto, and the mixture was poured into 6,000 g of n-hexane. The precipitated solid was separated by filtration and then dried under reduced pressure to give 75.2 g of a diol-terminated poly(styrene) (Compound B-8) (4,600 in weight average molecular weight). A mixture of 195 g of DVE-3, 10.6 g of Compound M-1, 58.0 g of Compound B-8, 21.2 g of TDI, 3.1 g of PDM, and 6.7 g of DEG was prepared and stirred at 60° C. A solution of 0.04 g of Stanoct (stannous octylate, manufactured by API Corporation) in 5 g of DVE-3 was further added to the mixture and stirred for 4 hours, so that a DVE-3 solution of Comparative Polymer P-9 (52,000 in weight average molecular weight, which was a polyurethane graft copolymer having a polystyrene side chain) was obtained.

Synthesis Example 10

Synthesis of DBE Solution of Comparative Polymer (P-10)

A mixture of 200 g of DBE, 10.0 g of 10-[(styrenyl)methyl]-9-acridanone, 5.0 g of 1-vinylimidazole (manufactured by Sigma-Aldrich Co.), and 85.0 g of AA-6 (methacryloyl-terminated poly(methyl methacrylate), manufactured by TOAGOSEI CO., LTD.) was prepared and stirred under a nitrogen atmosphere at 65° C. After the dissolution of 10-[(styrenyl)methyl]-9-acridanone was confirmed, 1.0 g of V-65 (2,2'-azobis(2,4-dimethylvaleronitrile), manufactured by Wako Pure Chemical Industries, Ltd. was added thereto. After a 2 hour reaction, 1.0 g of V-65 was added thereto and further stirred for 4 hours, so that a DBE solution of Comparative Polymer P-10 with no urethane structure (120,000 in weight average molecular weight) was obtained.

Synthesis Example 11

Synthesis of DVE-3 Solution of Comparative Polymer (P-11)

A mixture of 195 g of DVE-3, 3.9 g of Disperse Red 13 (manufactured by Sigma-Aldrich Co.), 70.1 g of Compound B-1, 20.3 g of MITEC GP770A, 4.4 g of PDM, and 1.2 g of DEG was prepared. After the solvent of MITEC GP770A was removed by distillation under reduced pressure, the mixture was heated to 60° C. A solution of 0.04 g of Stanoct in 5 g of DVE-3 was added to the mixture and stirred for 4 hours, so that a DVE-3 solution of Comparative Polymer P-11 (35,000 in weight average molecular weight, which was a pigment dispersing agent having a skeleton with a molecular weight corresponding to 80% of the molecular weight of a pigment, Pigment Red 4) was obtained.

Example 1

<Preparation of Pigment Dispersion 1>
A mixture of (a) 20 g of a pigment, Cinquasia Magenta RT355D (magenta color, PR 42:2, 9-dichloroquinacridone/quinacridone mixed crystal), (b) 20 g of a DVE-3 solution of Specific Polymer Compound P-1, and 60 g of DVE-3 was added to a motor mill (trade name: M-50, manufactured by Eiger Machinery, Inc) and dispersed with zirconia beads 0.65 mm in diameter at a circumferential speed of 9 m/second for 3 hours, so that Pigment Dispersion 1 was obtained.

<Preparation of Ink Composition 1>
A mixture of 20 g of Pigment Dispersion 1, (c) 31.5 g of a polymerizable compound, 1,6-hexanediol diacrylate (trade name: SR238, manufactured by Sartomer Company, Inc.), 27 g of dipropylene glycol diacrylate (trade name: SR508, manufactured by Sartomer Company, Inc.), 8 g of polyester acrylate (trade name: Ebecry 1657, manufactured by DAICEL-CYTEC COMPANY LTD.), 2.5 g of a polymerization initiator, 1-hydroxycyclohexyl phenyl ketone (trade name: Irgacure 184, manufactured by Ciba Specialty Chemicals, Inc.), 7 g of 2,4,6-trimethylbenzoyldiphenylphosphine oxide (trade name: Lucirin TPO, manufactured by BASF Japan Ltd.), 3.9 g of benzophenone (manufactured by Wako Pure Chemical Industries, Ltd.), and 0.1 g of a surfactant (trade name: BYK-307, manufactured by BYK Chemie) was prepared and then filtered through a membrane filter under pressure, so that an inkjet ink composition of Example 1 (Ink Composition 1) was obtained.

Example 2

<Preparation of Pigment Dispersion 2>
Pigment Dispersion 2 was prepared using the process of preparing Pigment Dispersion 1, except that (b) a DVE-3 solution of Specific Polymer Compound P-3 was used in place of the DVE-3 solution of Specific Polymer Compound P-1.

<Preparation of Ink Composition 2>
An inkjet ink composition of Example 2 (Ink Composition 2) was obtained using the process of preparing Ink Composition 1, except that Pigment Dispersion 2 was used in place of Pigment Dispersion 1.

Example 3

<Preparation of Pigment Dispersion 3>
A mixture of (a) 15 g of a pigment, HOSTAPERM VIOLET RL-NF (violet color, PV 23, dioxazine carbazole violet, manufactured by Clariant), (b) 20 g of a DVE-3 solution of Specific Polymer Compound P-5, and 65 g of DVE-3 was added to a motor mill (trade name: M-50, manufactured by Eiger Machinery, Inc) and dispersed with zirconia beads 0.65 mm in diameter at a circumferential speed of 9 m/second for 3 hours, so that Pigment Dispersion 3 was obtained.

<Preparation of Ink Composition 3>
A mixture of 10 g of Pigment Dispersion 3, (c) 31.5 g of a polymerizable compound, 1,6-hexanediol diacrylate (trade name: SR238, manufactured by Sartomer Company, Inc.), 40 g of dipropylene glycol diacrylate (trade name: SR508, manufactured by Sartomer Company, Inc.), 5 g of polyester acrylate (trade name: Ebecry 1657, manufactured by DAICEL-CYTEC COMPANY LTD.), 2.5 g of a polymerization initiator, 1-hydroxycyclohexyl phenyl ketone (trade name: Irgacure 184, manufactured by Ciba Specialty Chemicals, Inc.), 7 g of 2,4,6-trimethylbenzoyldiphenylphosphine oxide (trade name: Lucirin TPO, manufactured by BASF Japan Ltd.), 3.9 g of benzophenone (manufactured by Wako Pure Chemical Industries, Ltd.), and 0.1 g of a surfactant (trade name: BYK-307, manufactured by BYK Chemie) was prepared and then filtered through a membrane filter under pressure, so that an inkjet ink composition of Example 3 (Ink Composition 3) was obtained.

Comparative Example 1

<Preparation of Comparative Pigment Dispersion 1>

Comparative Pigment Dispersion 1 was prepared using the process of preparing Pigment Dispersion 1, except that (b) a DVE-3 solution of Specific Polymer Compound P-5 was used in place of the DVE-3 solution of Specific Polymer Compound P-1.

<Preparation of Comparative Ink Composition 1>

Comparative Ink Composition 1 was prepared using the process of preparing Ink Composition 1, except that Comparative Pigment Dispersion 1 was used in place of Pigment Dispersion 1.

Comparative Examples 2 and 3

<Preparation of Comparative Pigment Dispersions 2 and 3>

Comparative Pigment Dispersions 2 and 3 were prepared using the process of preparing Pigment Dispersion 1, except that (b) a DVE-3 solution of Specific Polymer Compound P-9 and a DBE solution of Specific Polymer Compound P-10 were used in place of the DVE-3 solution of Specific Polymer Compound P-1, respectively.

<Preparation of Comparative Ink Compositions 2 and 3>

Comparative Ink Compositions 2 and 3 were prepared using the process of preparing Ink Composition 1, except that Comparative Pigment Dispersions 2 and 3 were used in place of Pigment Dispersion 1, respectively.

Comparative Example 4

<Preparation of Comparative Pigment Dispersion 4>

Comparative Pigment Dispersion 4 was prepared using the process of preparing Pigment Dispersion 3, except that (b) a DVE-3 solution of Specific Polymer Compound P-8 was used in place of the DVE-3 solution of Specific Polymer Compound P-5.

<Preparation of Comparative Ink Composition 4>

Comparative Ink Composition 4 was prepared using the process of preparing Ink Composition 3, except that Comparative Pigment Dispersion 4 was used in place of Pigment Dispersion 3.

Comparative Example 5

<Preparation of Comparative Pigment Dispersion 5>

A mixture of (a) 15 g of a pigment, Hansa Red R (red color, PR 4, manufactured by Clariant), 20 g of a DVE-3 solution of Comparative Polymer P-11, and 65 g of DVE-3 was added to a motor mill (trade name: M-50, manufactured by Eiger Machinery, Inc) and dispersed with zirconia beads 0.65 mm in diameter at a circumferential speed of 9 m/second for 2 hours, so that Comparative Pigment Dispersion 5 was obtained.

<Preparation of Ink Composition 5>

A mixture of 10 g of Comparative Pigment Dispersion 5, (c) 31.5 g of a polymerizable compound, 1,6-hexanediol diacrylate (trade name: SR238, manufactured by Sartomer Company, Inc.), 40 g of dipropylene glycol diacrylate (trade name: SR508, manufactured by Sartomer Company, Inc.), 5 g of polyester acrylate (trade name: Ebecry 1657, manufactured by DAICEL-CYTEC COMPANY LTD.), 2.5 g of a polymerization initiator, 1-hydroxycyclohexyl phenyl ketone (trade name: Irgacure 184, manufactured by Ciba Specialty Chemicals, Inc.), 7 g of 2,4,6-trimethylbenzoyldiphenylphosphine oxide (trade name: Lucirin TPO, manufactured by BASF Japan Ltd.), 3.9 g of benzophenone (manufactured by Wako Pure Chemical Industries, Ltd.), and 0.1 g of a surfactant (trade name: BYK-307, manufactured by BYK Chemie) was prepared and then filtered through a membrane filter under pressure, so that an inkjet ink composition of Comparative Example 5 (Ink Composition 5) was obtained.

<Evaluation of Pigment Dispersions>

Each pigment dispersion was evaluated by the methods described below. The results are shown in Table 2.

-Structural Similarity-

The ratio of the molecular weight of a skeleton, which was contained in (b) the specific polymer compound or the comparative polymer and which was the same as a skeleton of (a) the pigment, to the molecular weight of the pigment (a) was used to evaluate structural similarity. Since Cinquasia Magenta RT355D is a mixed crystal of quinacridone (312.3 in molecular weight) and 2,9-dichloroquinacridone (381.2 in molecular weight), the average of these molecular weights (346.8) was used.

-Particle Diameter-

The particle diameter of each pigment dispersion was evaluated using a light scattering/diffraction particle diameter distribution analyzer (trade name: LB500, manufactured by HORIBA, Ltd.) and ranked according to the ranks given below. Rank A is the best in the evaluation.

The case where the pigment was Cinquasia Magenta RT355D (Examples 1 and 2 and Comparative Examples 1 to 3)

A: The median diameter was from 80 nm to less than 120 nm.
B: The median diameter was from 120 nm to less than 170 nm.
C: The median diameter was 170 nm or more.

The case where the pigment was HOSTAPERM VIOLET RL-NF (Example 3 and Comparative Example 4)

A: The median diameter was from 50 nm to less than 100 nm.
B: The median diameter was from 100 nm to less than 150 nm.
C: The median diameter was 150 nm or more.

The case where the pigment was Hansa Red R (Comparative Example 5)

A: The median diameter was from 150 nm to less than 200 nm.
B: The median diameter was from 200 nm to less than 300 nm.
C: The median diameter was 300 nm or more.

-Viscosity-

The viscosity of each inkjet ink composition was measured at 25° C. with an E-type viscometer (trade name: RE-80L, manufactured by TOKI SANGYO CO., LTD.) and ranked according to the ranks given below. Rank A is the best in the evaluation.

A: The viscosity was less than 500 mPas.
B: The viscosity was from 500 mPas to less than 1,200 mPas.
C: The viscosity was 1,200 mPas or more (at such a level that the circulation of the pigment dispersion came to a stop during the dispersion process).

<Evaluation of Ink Compositions>

Each inkjet ink composition was evaluated by the methods described below. The results are shown in Table 2.

-Particle diameter-

The particle diameter of each inkjet ink composition was evaluated using a light scattering/diffraction particle diameter distribution analyzer (trade name: LB500, manufactured by HORIBA, Ltd.) and ranked according to the ranks given below. Rank A is the best in the evaluation.

The case where the pigment was Cinquasia Magenta RT355D (Examples 1 and 2 and Comparative Examples 1 to 3)
A: The median diameter was from 80 nm to less than 120 nm.
B: The median diameter was from 120 nm to less than 170 nm.
C: The median diameter was 170 nm or more.

The case where the pigment was HOSTAPERM VIOLET RL-NF (Example 3 and Comparative Example 4)
A: The median diameter was from 50 nm to less than 100 nm.
B: The median diameter was from 100 nm to less than 150 nm.
C: The median diameter was 150 nm or more.

The case where the pigment was Hansa Red R (Comparative Example 5)
A: The median diameter was from 150 nm to less than 200 nm.
B: The median diameter was from 200 nm to less than 300 nm.
C: The median diameter was 300 nm or more.

-Viscosity-
The viscosity of each inkjet ink composition at 25° C. was measured with an E-type viscometer (trade name: RE-80L, manufactured by TOKI SANGYO CO., LTD.). The following scale of evaluation was used.
A: The viscosity was less than 30 mPas.
B: The viscosity was from 30 mPas to less than 50 mPas (nozzle clogging began to occur during jetting).
C: The viscosity was 50 mPas or more (problematic nozzle clogging frequently occurred).

-Stability-
Each inkjet ink composition was stored at 25° C. for 4 weeks, and subsequently at 60° C. for 1 week, and then evaluated in terms of dispersion state, based on visual observation and the change in viscosity thereof. The following scale of evaluation was used.
A: A high level of stability, with no precipitation and a viscosity increase of less than 5%.
B: A moderate level of stability; no problems with jetting, no precipitation, and a viscosity increase of 5% to less than 10%.
C: A problematic, practically low level of stability, with no precipitation but with a viscosity increase of 10% or more, and deficiencies in jetting.
D: A problematic, practically low level of stability, with precipitation and liquid separation observed.

-Clogged Nozzle-
Each inkjet ink composition was subjected to 10 cycles of heating and cooling between 25° C. and 60° C. Thereafter, three sheets of A4-size solid prints were made using the ink composition and an inkjet recording test device with piezo-type inkjet nozzles (printing density, 300 dpi; jetting frequency, 4 kHz; the number of nozzles, 64). The presence or absence of a clogged nozzle was observed, and an evaluation was made according to the criteria shown below.
A: No nozzle clogging occurred, and a high quality image was formed.
B: Satellite droplets were formed in part, and a defect was observed in the image.
C: Nozzle clogging occurred, and a significant image defect was produced.

-Curing Properties and Anti-Blocking Properties-
In the inkjet recording test device, solid printing was performed on a polyvinyl chloride sheet at exposure energy of 3,000 mJ/cm$^2$ with a deep UV lamp (trade name: SP-7, manufactured by USHIO INC.), thereby obtaining a print sample. In this process, the ink composition of each of the examples and the comparative examples was well cured, and stickiness was not observed when the cured film was touched with a finger.

In addition, three sheets of printed samples were stacked, and a weight was placed thereon to attain 1 g/cm$^3$. After 6 hours, a blocking resistance test was performed in which adherence of the printed surface to the sheet placed thereon was evaluated. Good anti-blocking properties were obtained, and adhesion was not observed in any of the printed samples.

TABLE 2

|  | Specific polymer compound or comparative polymer | Similarity | Evaluation of pigment dispersion | | | Evaluation of ink composition | | | | |
|---|---|---|---|---|---|---|---|---|---|---|
|  |  |  | Pigment dispersion | Particle size | Viscosity | Particle size | Viscosity | Stability (room temperature) | Stability (60° C.) | Nozzle clogging |
| Example 1 | DVE-3 solution of P-1 | 56% | Pigment dispersion 1 | A | A | A | A | A | A | A |
| Example 2 | DVE-3 solution of P-3 | 56% | Pigment dispersion 2 | A | A | A | A | A | A | A |
| Example 3 | DVE-3 solution of P-5 | 28% | Pigment dispersion 3 | A | A | A | A | A | B | A |
| Comparative Example 1 | DVE-3 solution of P-5 | 0% | Comparative pigment dispersion 1 | C | C | C | B | C | D | C |
| Comparative Example 2 | DVE-3 solution of P-9 | 56% | Comparative pigment dispersion 2 | C | B | B | B | B | C | C |
| Comparative Example 3 | DBE solution of P-10 | 56% | Comparative pigment dispersion 3 | B | A | B | A | A | C | C |
| Comparative Example 4 | DVE-3 solution of P-8 | 0% | Comparative pigment dispersion 4 | A | C | B | B | B | C | B |
| Comparative Example 5 | DVE-3 solution of P-11 | 80% | Comparative pigment dispersion 5 | C | C | C | B | B | C | C |

It is apparent from Table 2 that the pigment is finely dispersed in the pigment dispersion of each Example and well dispersed due to the low viscosity thereof. In response to the irradiation, the ink composition prepared with the pigment dispersion of each Example was cured with high sensitivity, and formed a high quality image with no stickiness. Even after long-term storage, the ink composition prepared with the pigment dispersion of each Example did not show a viscosity increase associated with a reduction in the pigment dispersibility, and had both good pigment dispersibility and good pigment dispersion stability. It is also apparent that the ink composition prepared with the pigment dispersion of each Example had improved anti-blocking properties, did not cause nozzle clogging, and formed a high quality image.

In contrast, when a polymer dispersing agent without a skeleton substantially the same as the pigment was used (Comparative Examples 1 and 4) or when a polymer dispersing agent with very high similarity to the pigment was used (Comparative Example 5), a low-viscosity pigment dispersion was not obtained, and the ink composition prepared with the resulting pigment dispersion had low stability (storage stability) particularly under high temperature conditions (60° C.), which was a practically low level, and caused an observable image defect.

A pigment dispersion containing a finely dispersed pigment was not obtained in Comparative Example 2 in which although a skeleton substantially the same as the pigment was provided, the side chain thereof was polystyrene, and was also not obtained in Comparative Example 3, where no urethane bond was provided. In these comparative examples, nozzle clogging occurred, and the stability (storage stability) under high temperature conditions (60° C.) was at a practically low level.

The ink composition of the invention not only makes it possible to form sharp images with high color development and to produce high-quality prints in general printing, but also is suitable for use in the production of resists, color filters and optical discs and useful as a stereolithography material.

The ink composition of the invention is also suitable for use in large-area printing, because the use of inkjet recording makes it possible to form high-quality images directly on non-absorbent recording media based on digital data.

According to the invention, there is provided a pigment dispersion containing a finely dispersed pigment and having good dispersion stability.

According to the invention, there is also provided an ink composition that contains the pigment dispersion and is capable of forming high-quality images with vivid color tone and high coloring strength and suitable for use in inkjet recording.

According to the invention, there are also provided a curable composition and a curable ink composition, each of which contains the pigment dispersion and is capable of being cured by the application of active energy rays.

What is claimed is:

1. A pigment dispersion, comprising:
   (a) a pigment; and
   (b) a polymer compound as a dispersant for the pigment (a),
   wherein the polymer compound comprises a urethane bond in a main chain, comprises a pendant moiety comprising a skeleton which is the same as a partial skeleton of the pigment (a), and further comprises, at a side chain, at least one polymer chain selected from the group consisting of a polyester chain, a poly(meth)acrylate chain, and a polyalkylene oxide chain,
   wherein the molecular weight of the skeleton which is the same as a partial skeleton of the pigment (a) is from 20 to 70% of the molecular weight of the pigment (a), and
   wherein the skeleton which is the same as a partial skeleton of the pigment (a) is a fused ring structure consisting of two or more rings.

2. The pigment dispersion according to claim 1, wherein the weight average molecular weight of the polymer compound is from 5,000 to 200,000.

3. The pigment dispersion according to claim 1, wherein the average particle diameter of the pigment is from 0.01 μm to 0.4 μm.

4. The pigment dispersion according to claim 1, wherein the pigment is included in the pigment dispersion at an amount of from 1 to 40% by weight with respect to the total solid content of the pigment dispersion.

5. An ink composition, comprising the pigment dispersion according to claim 1.

6. A curable composition, comprising the pigment dispersion according to claim 1 and (c) a polymerizable compound.

7. A curable ink composition, comprising the curable composition according to claim 6.

8. A method for manufacturing the pigment dispersion according to claim 1, the method comprising:
   preparing the polymer compound by reacting
   (i) a derivative having one or two hydroxyl groups or one or two isocyanate groups, and having a skeleton that is the same as a partial skeleton of the pigment,
   (ii) one of a polyester having one or two hydroxyl groups at the terminal, a poly(meth)acrylate having one or two hydroxyl groups at the terminal or a polyalkylene oxide having one or two hydroxyl groups at the terminal, and
   (iii) a bifunctional or polyfunctional isocyanate compound; and
   dispersing the pigment and the polymer compound.

9. The pigment dispersion according to claim 1, wherein a combination of the pigment and the skeleton which is the same as a partial skeleton of the pigment is selected from the group of combinations consisting of:
   an acetolone pigment or a naphtholone pigment with a benzimidazolone structure;
   a quinacridone pigment with an acridone structure;
   a perylene pigment with a phthalimide structure;
   an anthraquinone pigment with an anthraquinone structure;
   a naphthol AS pigment with an azo substituent-free naphthalene structure; and
   a dioxazine violet pigment with a carbazole structure.

* * * * *